Figure 1:
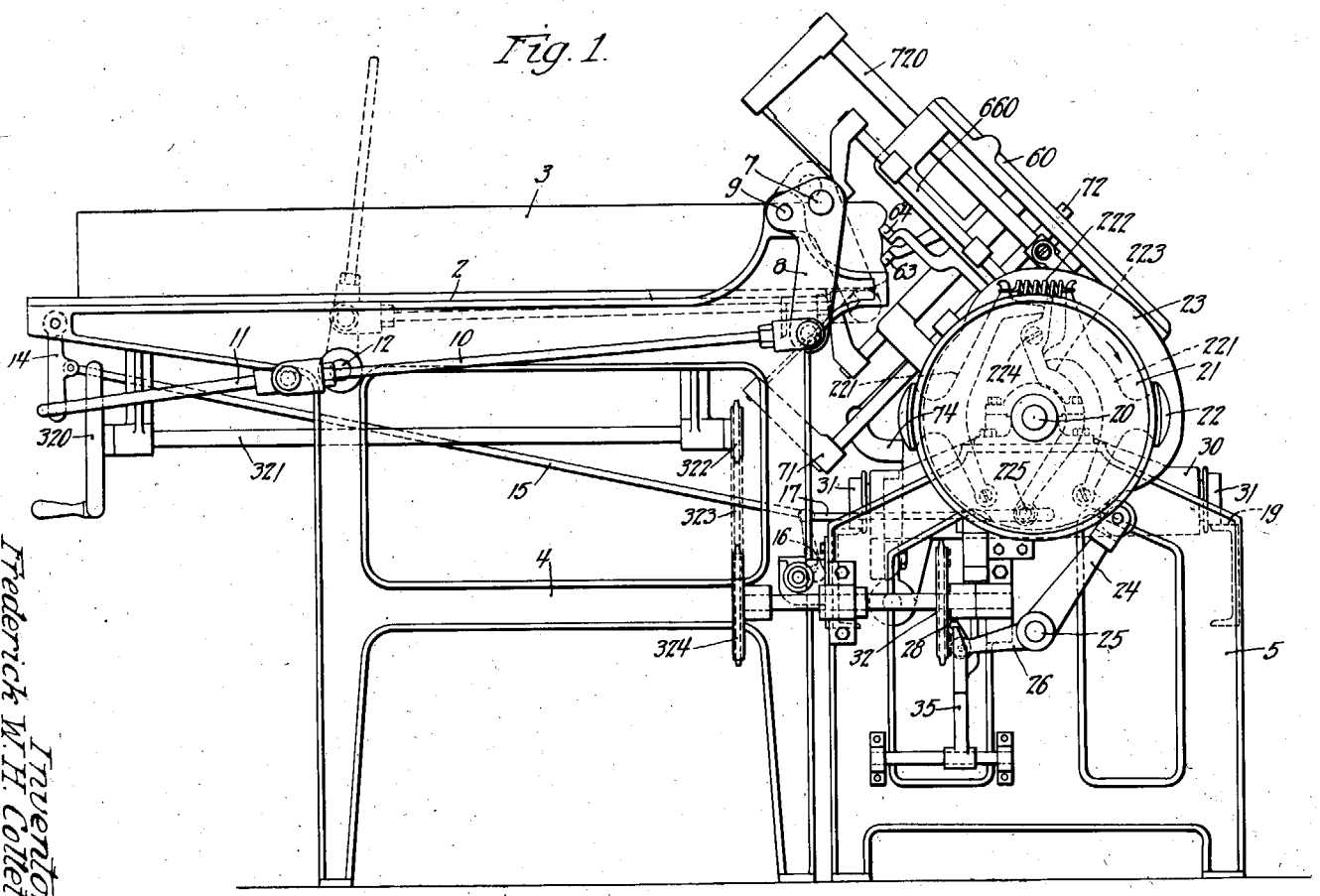

Feb. 22, 1927. Re. 16,555

F. W. H. COLLETT

MATTRESS SIDE STITCHING MACHINE

Original Filed April 14, 1919 11 Sheets-Sheet 1

Inventor,
Frederick W. H. Collett.
By: Fisher Towle Clapp + Sparks Attys.

Feb. 22, 1927. F. W. H. COLLETT Re. 16,555

MATTRESS SIDE STITCHING MACHINE

Original Filed April 14, 1919 11 Sheets-Sheet 2

Feb. 22, 1927. F. W. H. COLLETT Re. 16,555

MATTRESS SIDE STITCHING MACHINE

Original Filed April 14, 1919 11 Sheets-Sheet 3

Inventor.
Frederick W. H. Collett.
By: Fisher Fowle Clapp & Sears
Attys.

Feb. 22, 1927. F. W. H. COLLETT Re. 16,555

MATTRESS SIDE STITCHING MACHINE

Original Filed April 14, 1919 11 Sheets-Sheet 4

Inventor
Frederick W. H. Collett.
By: Fisher Towle Clapp & Sears Attys.

Feb. 22, 1927. F. W. H. COLLETT Re. 16,555

MATTRESS SIDE STITCHING MACHINE

Original Filed April 14, 1919 11 Sheets-Sheet 5

Inventor,
Frederick W. H. Collett.
By: Fisher Towle Clapp & Sears
Attys.

Feb. 22, 1927. F. W. H. COLLETT Re. 16,555

MATTRESS SIDE STITCHING MACHINE

Original Filed April 14, 1919 11 Sheets-Sheet 6

Inventor
Frederick W.H. Collett.
By: Fisher Towle Clapp & Sears Attys

Feb. 22, 1927. F. W. H. COLLETT Re. 16,555

MATTRESS SIDE STITCHING MACHINE

Original Filed April 14, 1919 11 Sheets-Sheet 7

Inventor.
Frederick W. H. Collett.
By: Fisher Fowle Clapp & Sears Attys.

Feb. 22, 1927. F. W. H. COLLETT Re. 16,555

MATTRESS SIDE STITCHING MACHINE

Original Filed April 14, 1919 11 Sheets-Sheet 8

Inventor.
Frederick W. H. Collett.
By: Fisher Towle Clapp & Soans Attys.

Feb. 22, 1927. F. W. H. COLLETT Re. 16,555

MATTRESS SIDE STITCHING MACHINE

Original Filed April 14, 1919 11 Sheets-Sheet 9

Inventor.
Frederick W. H. Collett.
By: Fisher Towle Clapp & Sonns
Attys.

Feb. 22, 1927. F. W. H. COLLETT Re. 16,555

MATTRESS SIDE STITCHING MACHINE

Original Filed April 14, 1919 11 Sheets-Sheet 10

Inventor.
Frederick W. H. Collett.
By: Fisher Towle Clapp & Sears Attys.

Feb. 22, 1927. F. W. H. COLLETT Re. 16,555

MATTRESS SIDE STITCHING MACHINE

Original Filed April 14, 1919 11 Sheets-Sheet 11

Inventor.
Frederick W. H. Collett.
By: Fisher Towle Clapp & Soans Attys.

Reissued Feb. 22, 1927. Re. 16,555

UNITED STATES PATENT OFFICE.

FREDERICK W. H. COLLETT, DECEASED, LATE OF CAMBRIDGE, MASSACHUSETTS; BY SIMMONS COMPANY, ASSIGNEE, OF KENOSHA, WISCONSIN, A CORPORATION OF DELAWARE.

MATTRESS-SIDE-STITCHING MACHINE.

Original No. 1,342,423, dated June 8, 1920, Serial No. 290,005, filed April 14, 1919. Application for reissue filed June 30, 1921. Serial No. 481,710.

This invention relates to a mattress side stitching machine, the object of the invention being to produce an organized machine for side-stitching mattresses.

The purpose of what is known as side-stitching is to connect the fabric or covering around the sides of the mattress with the stuffing of the mattress from point to point in order to keep the sides approximately square or to prevent them from bulging under the expansive action of the mattress stuffing.

In some cases what is known as roll-edge side-stitching is used in which the fabric around the sides of the mattress is engaged by thread or twine extending diagonally through the stuffing and through the top surface fabric of the mattress in one line of stitching, and through the side surface, stuffing, and bottom surface in another line of stitching. Thus so long as the stitching holds properly it keeps the corners or lines of junction of the side surface with the top and bottom surfaces square.

The side-stitching has usually been performed by a hand operation with a continuous length of twine or thread which is passed by a needle through the side surfaces from point to point and engaged with the stuffing, or with the stuffing and the top or bottom surface fabric as the case may be, leaving a short length of the twine showing on the fabric between adjacent needle holes through which the twine passes to the inside of the mattress. If such continuous twine or line of stitching becomes broken at any point it loosens the entire seam which soon becomes ineffective for retaining the mattress in proper shape or condition.

Other features of the invention are an improved knot-tying mechanism, an improved method of, and apparatus for concealing the knot in the interior of the mattress, an improved method of and means for severing the ends of twine protruding from the mattress after the knot has been tied, and an improved mattress-making apparatus so organized as to permit of the insertion of individual ties into a mattress to produce a roll edge. The practicing of the improved process and the use of the improved machine is designed to produce a mattress having important features of novelty and advantage over the prior art.

The present invention is embodied in an organized machine for side stitching adapted to produce side-stitching of the roll-edge type in which the side surface fabric is connected from point to point with the top surface fabric by one line of stitching, and from point to point with the bottom surface fabric by another line of stitching, the character of the stitching being however, different from that resulting from the continuous running twine as applied to the usual hand stitching.

In the operation of the machine herein shown and described as an embodiment of the present invention the side surface fabric of the mattress is tied to the top or bottom surface fabric at given points by loops of the twine or thread, the ends of which are tied together by a knot, in this instance of the kind known as a weaver's knot, the knot being drawn through the fabric to the inside of the mattress so that nothing shows upon the outside of the mattress except the short length of thread exending beween two adjacent needle holes which forms the tying or anchoring engagement of the twine with the fabric.

The machine forming the subject of the present invention comprises a stationary table or holder for the mattress, and a traveling stitching, including knot tying, mechanism, mounted for movement on a suitable guideway, and acted upon by a suitable feed mechanism which advances the stitching mechanism from stitch to stitch along the side of the mattress on the mattress support.

For convenience the component of the machine which consists of the mechanism for introducing the thread and tying the knots considered as a unit will be called the stitcher, and in the present example of the invention the stitcher comprises two similar sets of cooperating stitch forming devices, with suitable actuating mechanism common to both sets, one of which sets acts at the upper corner of the mattress to stitch or tie together the side surface fabric next to the stitcher and the top surface fabric of the mattress, while the other acts in a similar manner at the lower corner to tie together the side fabric and lower surface fabric of the mattress.

The invention comprises the general organization of the machine as above indicated, as well as various combinations of mechanism for performing the stitching, including knot-tying, operations as will be explained in connection with the embodiment of the invention shown in the accompanying drawings.

By having the machine so organized that the stitching is performed along both edges or corners of one side of the mattress at a time, not only is the output more than double that of a machine capable of sewing only one corner at a time, but the stresses on the mattress are balanced and there is no distortion such as results when one corner or edge of one side is stitched before the other corner is stitched.

Stitching one corner while the other corner remains unstitched produces distortion of the side of the mattress, and an unevenness in the distribution of the stuffing material which are very difficult to eliminate when the other corner is subsequently stitched.

It will facilitate the understanding of the machine to state that in general the following terminology will be used.

The term bight indicates a fold of the twine back against itself, the part of indefinite length extending from a ball or supply to the fold being called the standing part and the shorter part terminating beyond the fold being called the end.

A loop is a complete turn of the end portion of the twine and may be regarded as a rather open bight with the end crossing the standing part of the twine.

A closed loop is merely an endless piece of material such as would result from fastening a loop at the intersection of the end and standing part, or from tying together the ends of a comparatively short piece of twine.

Each stitch produced by the machine herein shown as an embodiment of the invention is a closed loop encircling a portion each of the side fabric and of the top or bottom fabric, as the case may be, between two needle holes, and also encircling the portion of the stuffing lying between the side and top or bottom fabrics and between lines extending from the needle holes in the side fabric to the corresponding needle holes in the bottom or top fabric.

While the stitch is made from a single twine of indefinite length, the knotted loop, resulting from each cycle of stitch forming operations is cut off from the supply thread, leaving only the short length forming the closed loop as the final twine component of each stitch.

A weaver's knot may be used to tie together two ends of a short length of twine to form a closed loop, and such knot may be regarded as comprising a simple bight at one end, and a loop formed of the other end around the standing part and end of said bight and having its own end passed through the bight.

In the machine to be described the stitch forming instrumentalities comprise a needle, operating from one side of the material to penetrate it and emerge with a bight at the other side, and a set of contrivances, herein collectively referred to as the knotter, which with some further accessory devices cooperate with the needle.

The complete cycle of operations for making each stitch comprises two descents of the needle, at the first of which a bight is presented to the knotter, and at the second of which the first bight which was presented to the knotter has been converted thereby into a loop, through which the bight presented by the needle at its second descent is passed, whereupon said loop, which thus encircles the standing part and end of the second bight, has its end passed through said second bight so as to complete the formation of the weaver's knot, after which a surplus which formed a part of the end of the first bight is cut off and the standing portion of the second bight is cut between the knot and the needle leaving a sufficient portion beyond the needle to serve as the end of the first bight to be presented by the needle for the production of the next stitch.

Figure 2:
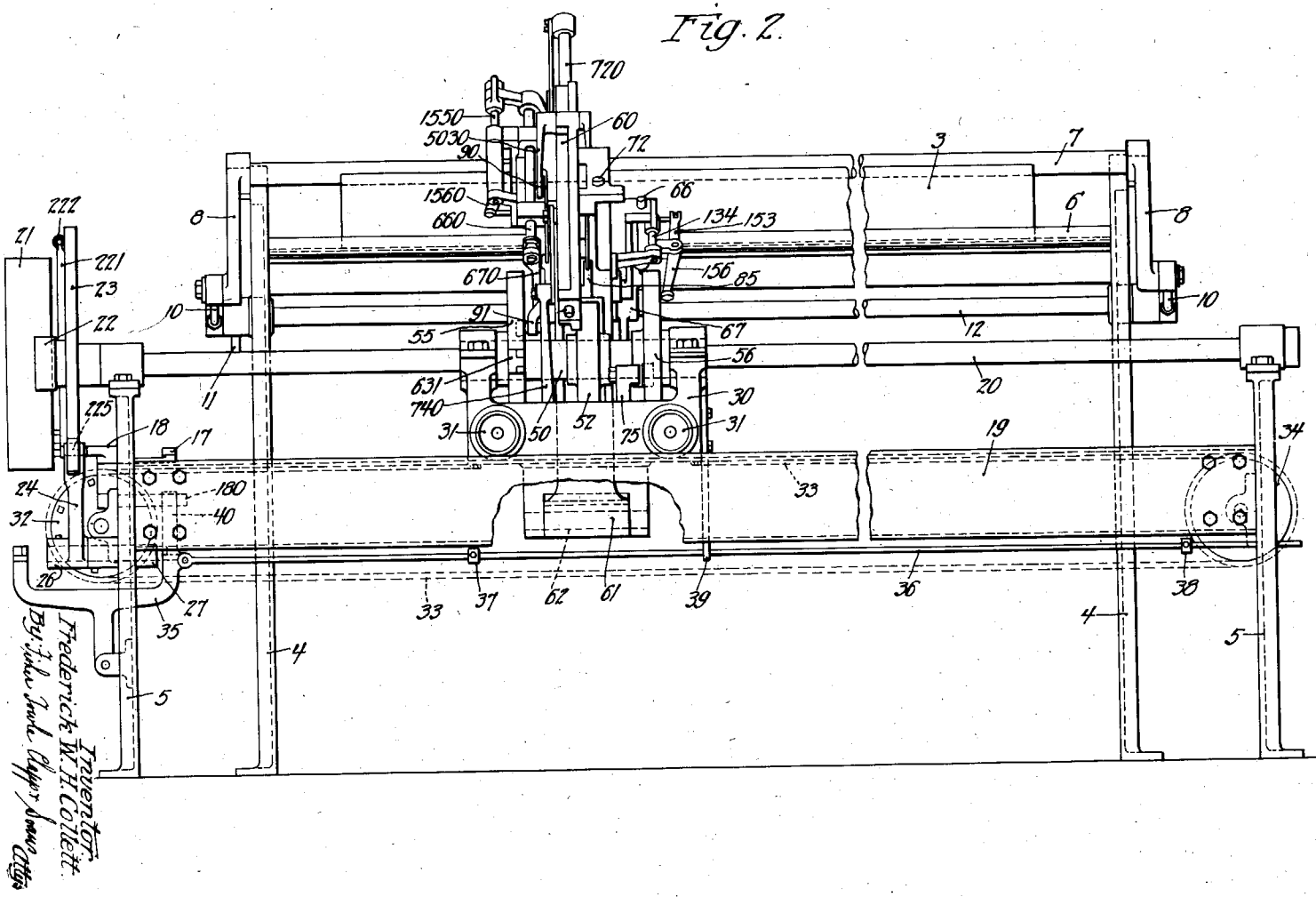
Figure 3:
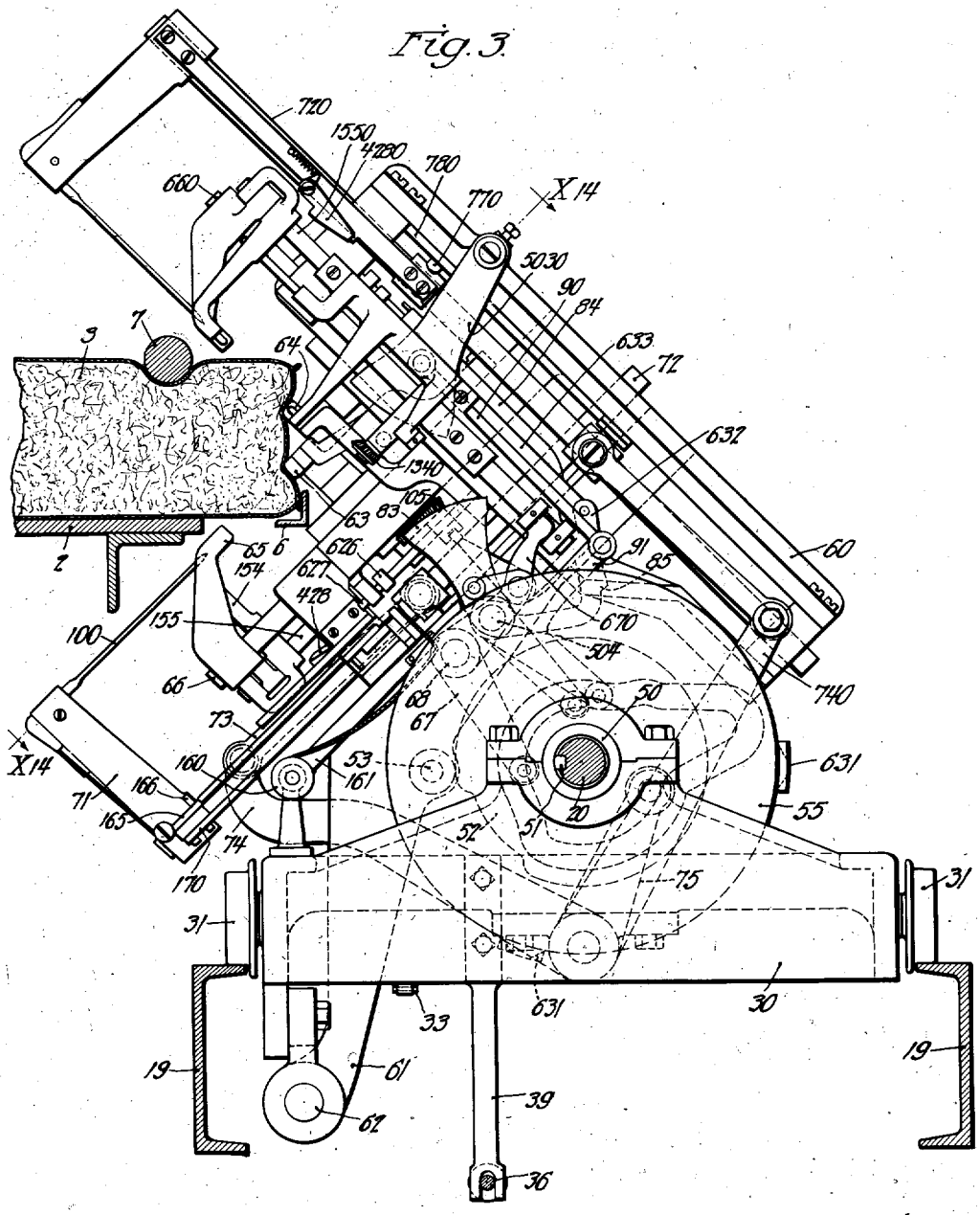
Figure 4:
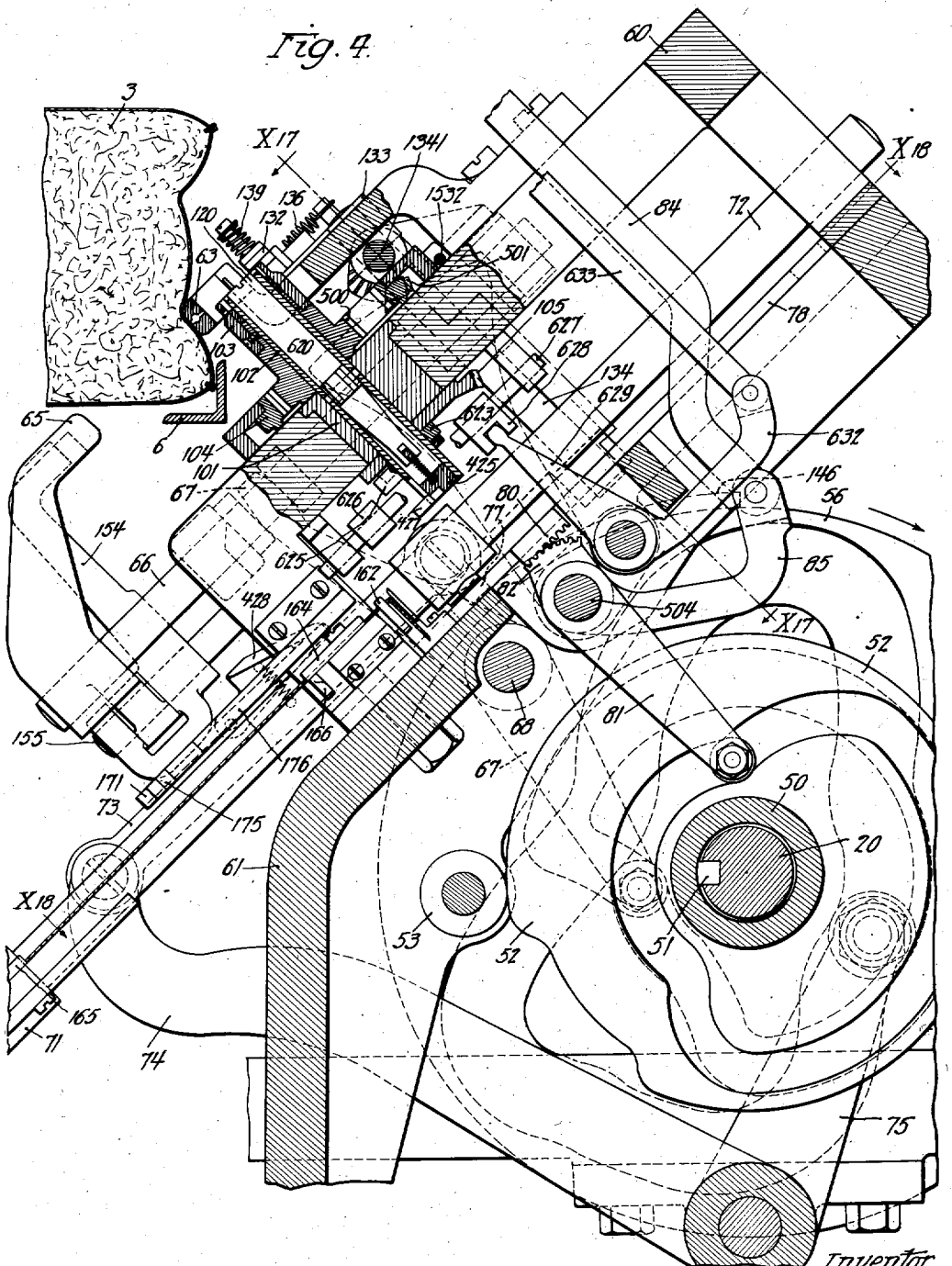
Figure 5:
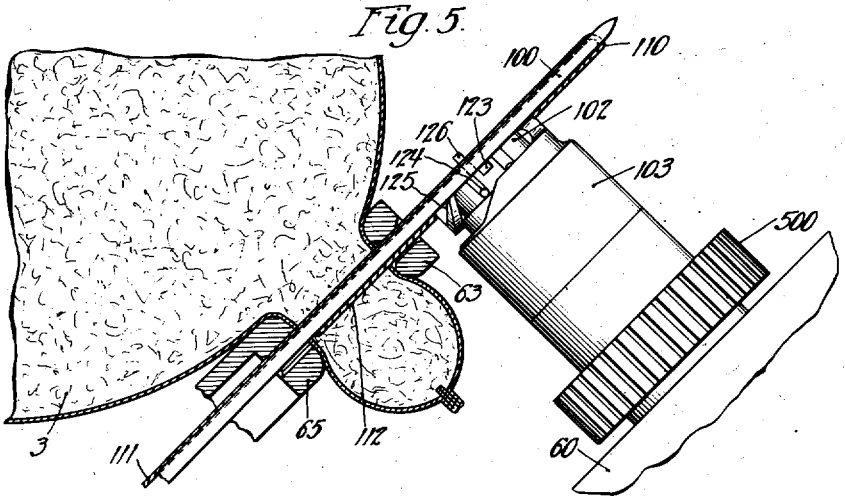
Figure 6:
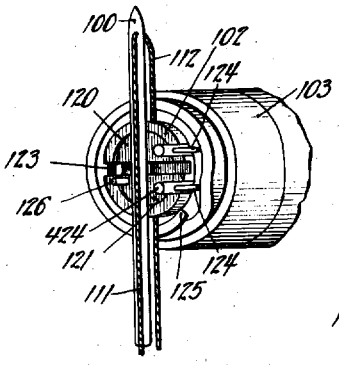
Figure 7:
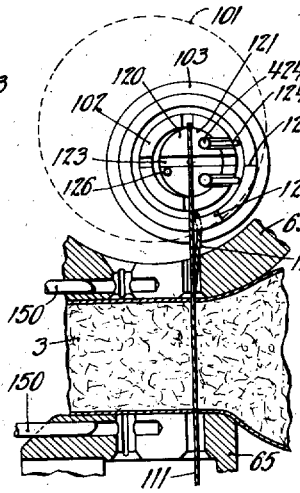
Figure 8:
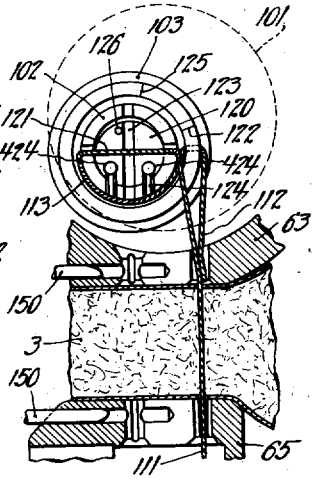
Figure 9:
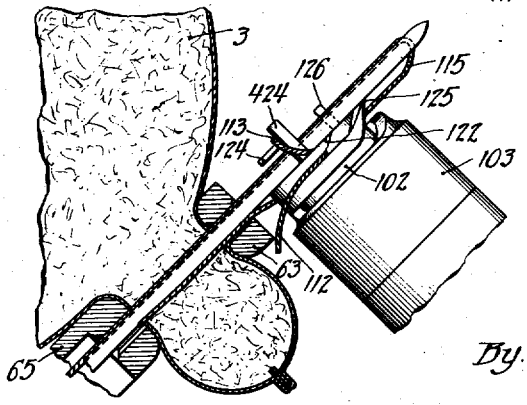
Figure 10:
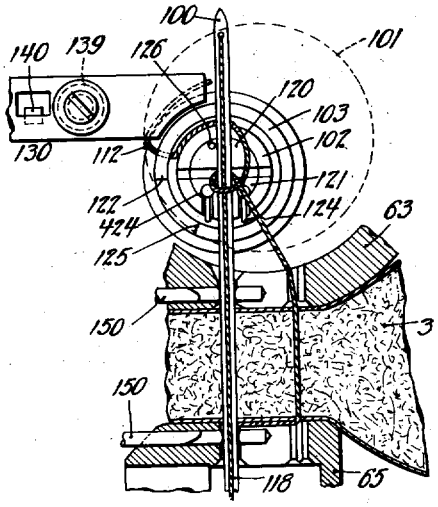
Figure 11:
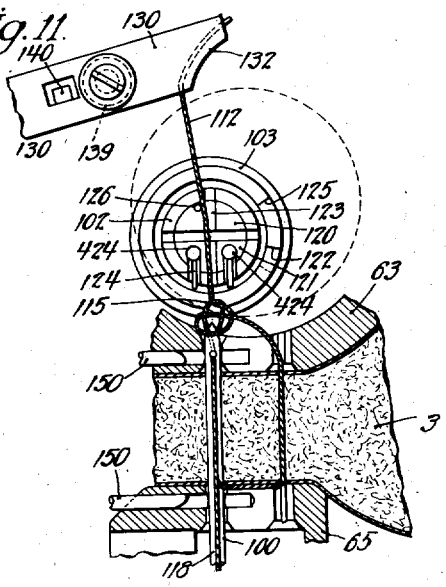
Figure 13:
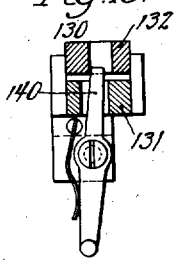
Figure 12:
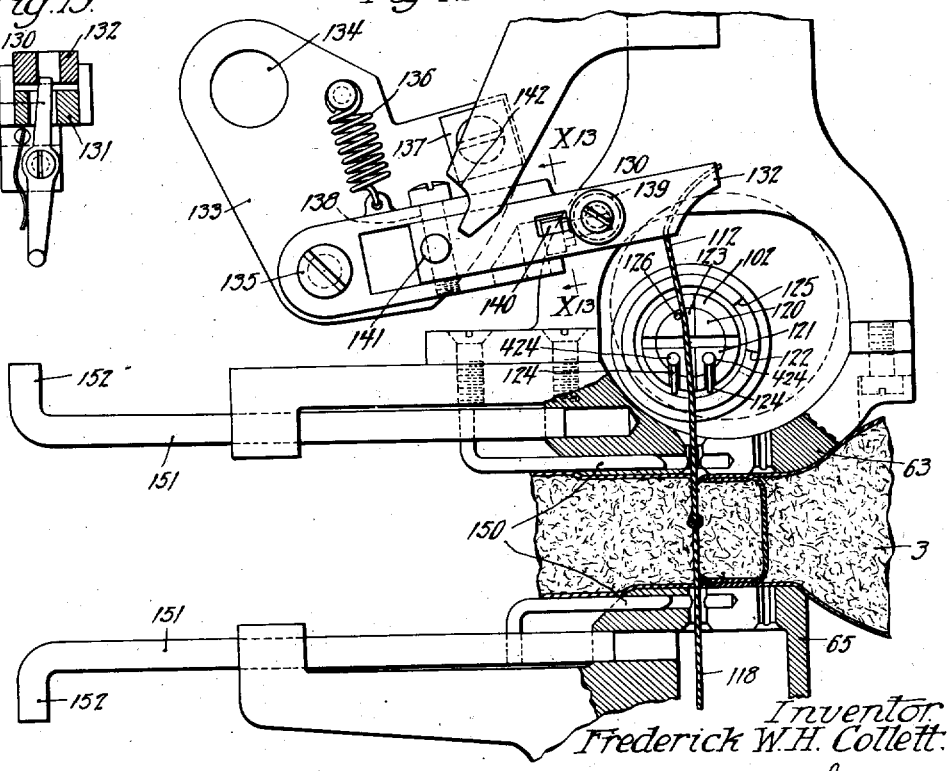
Figure 14:
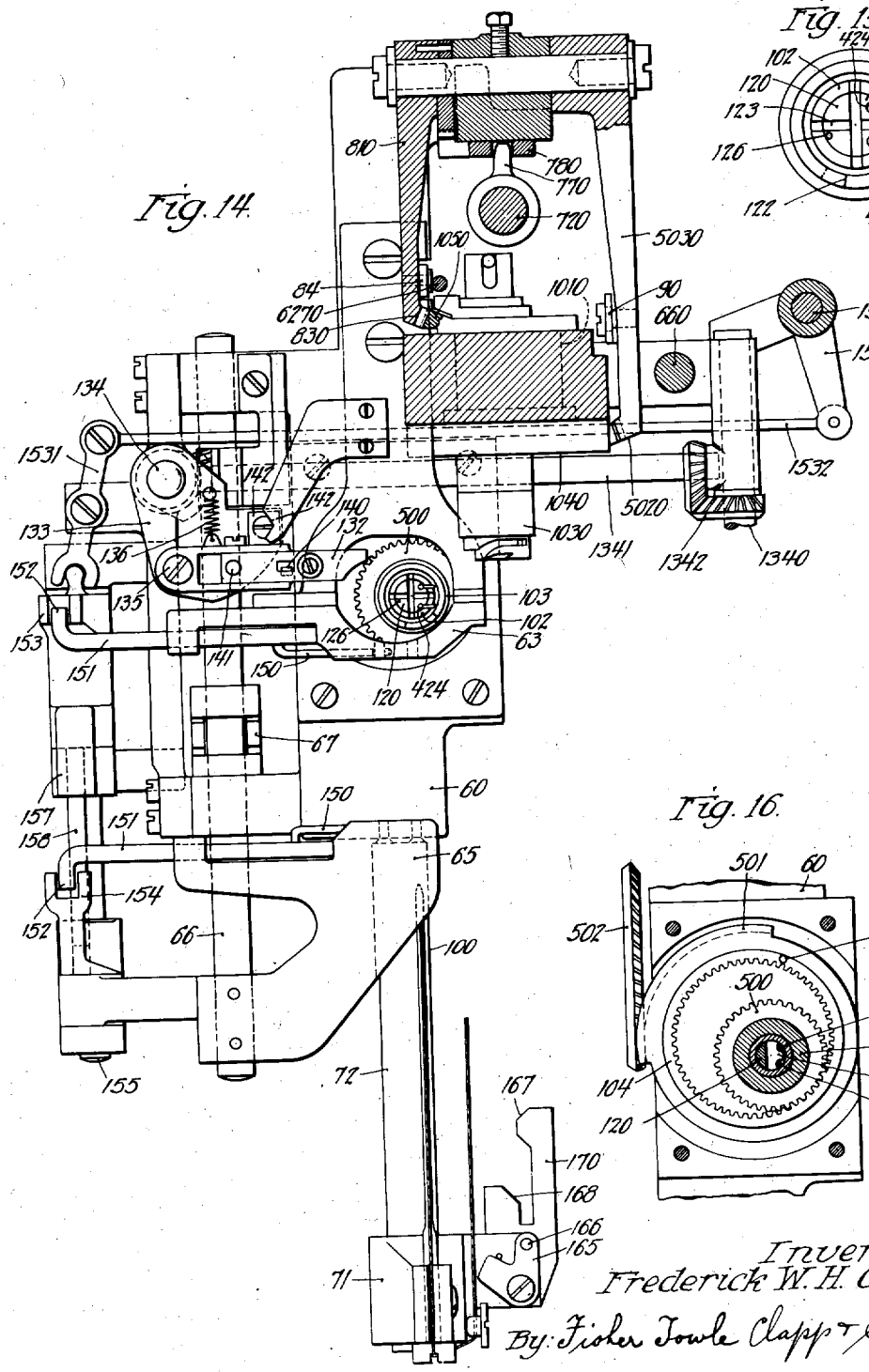
Figure 15:
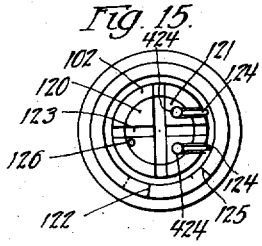
Figure 16:
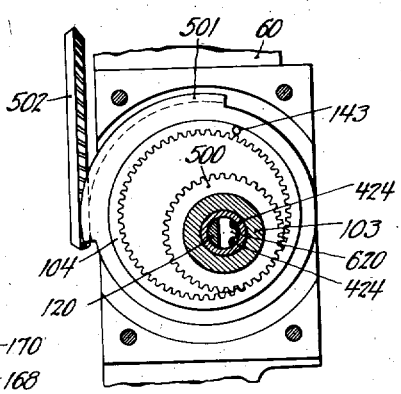
Figure 17:
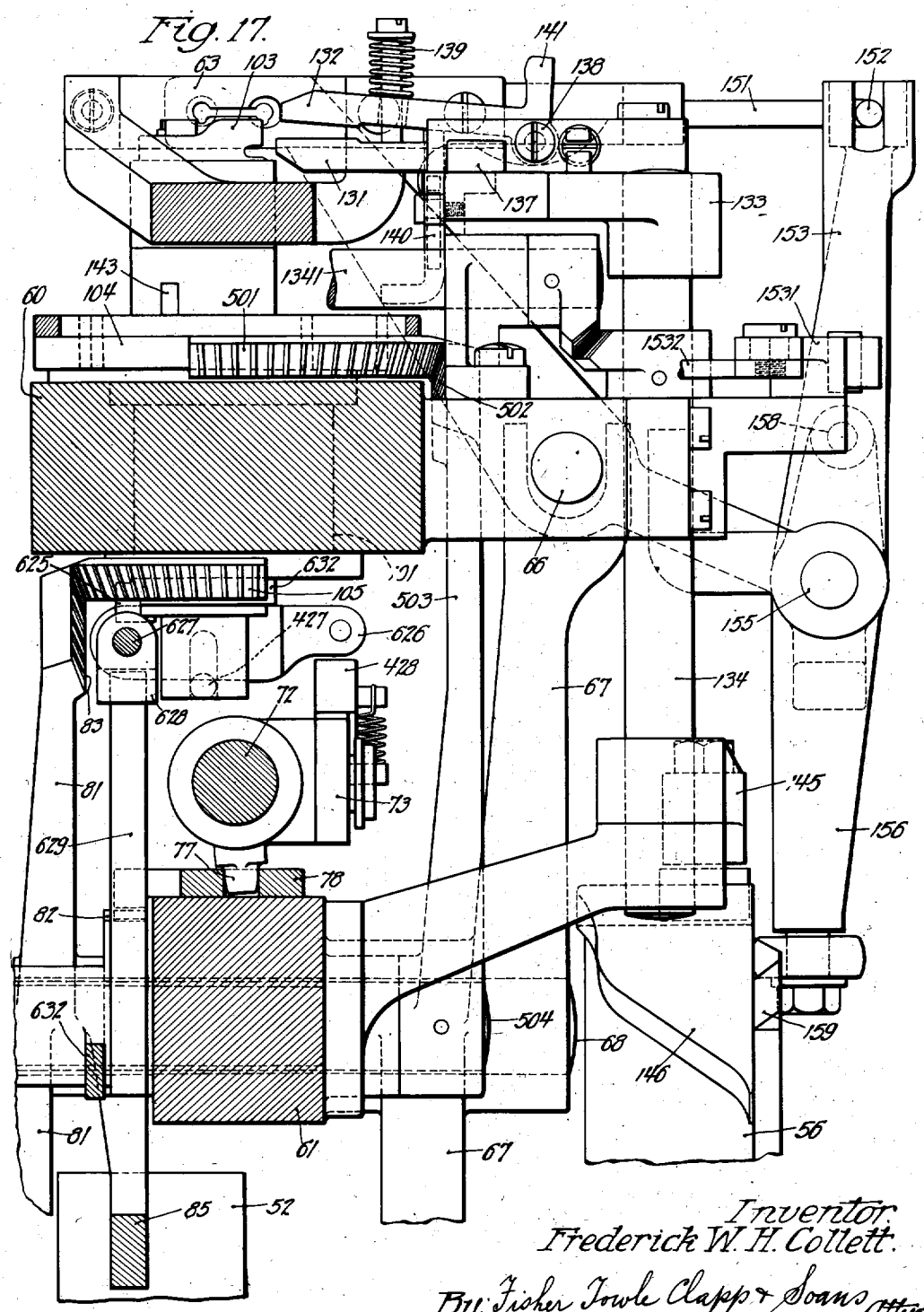
Figure 22:
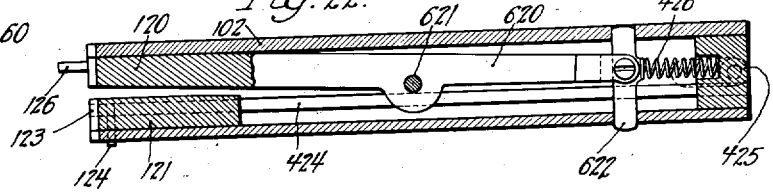
Figure 23:
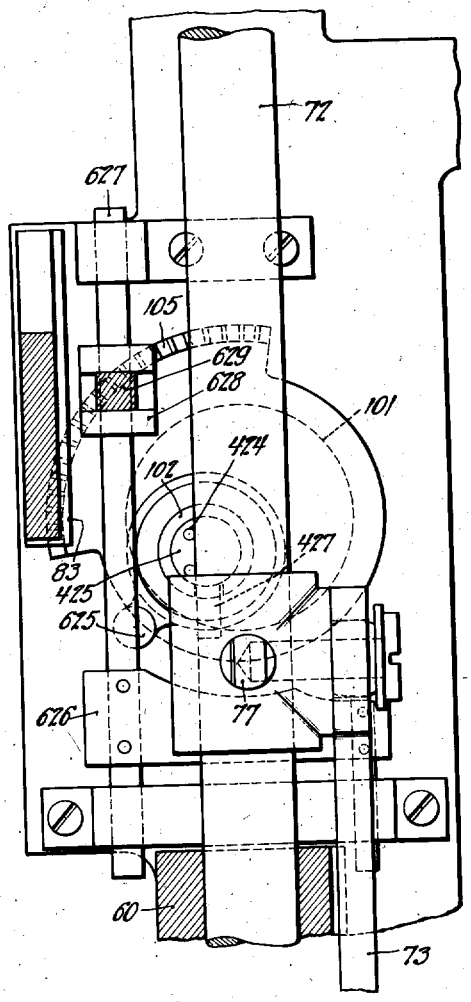
Figure 24:
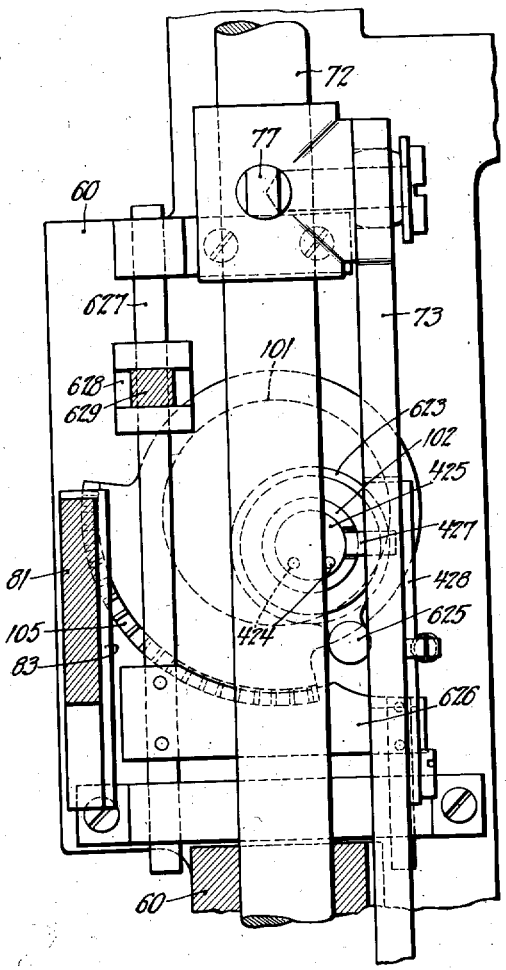
Figure 25:
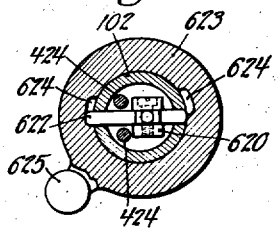
Figure 26:
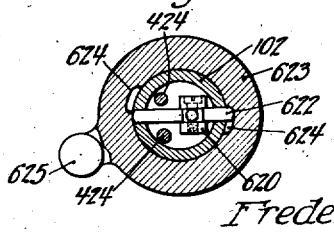
Figure 27:
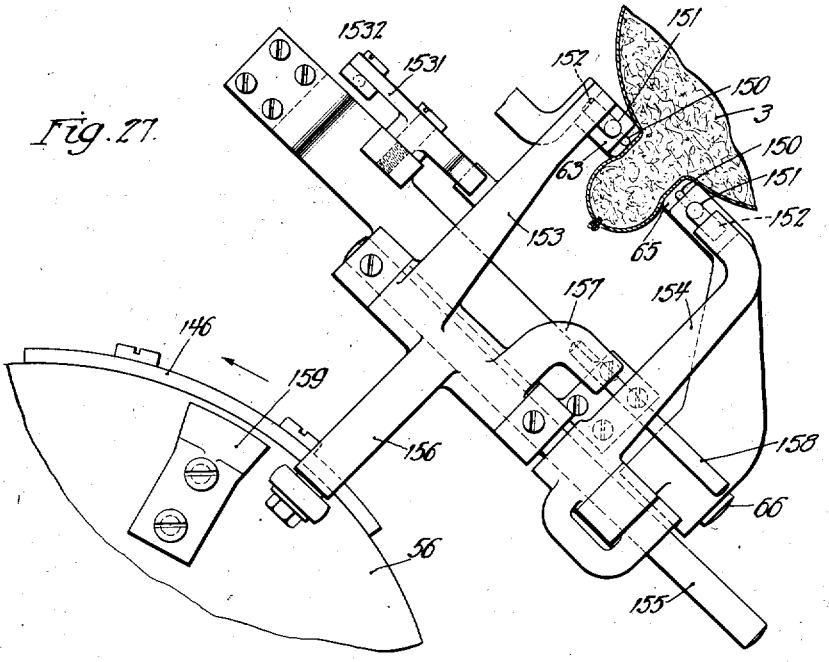
Figure 28:
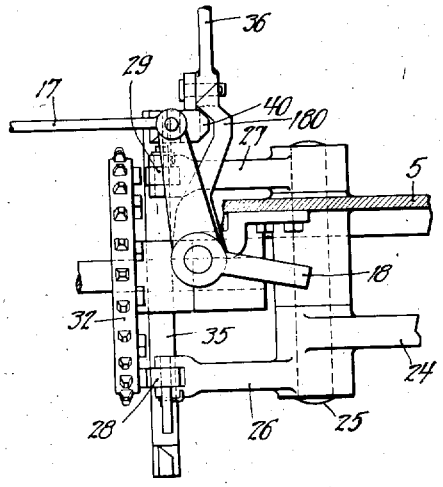
Figure 29:
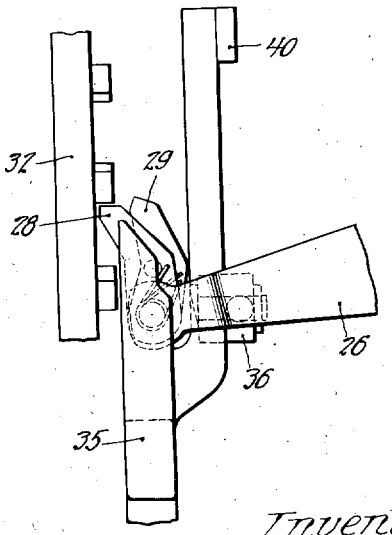

In the accompanying drawings:

Fig. 1 is an end elevation on a reduced scale of a complete mattress side-stitching machine embodying this invention;

Fig. 2 a rear elevation thereof;

Fig. 3 an end elevation on a larger scale of the traveling stitcher showing a portion of the frame work of the main machine, including the support or holder for the mattress in section;

Fig. 4 a sectional elevation on a still larger scale of the stitcher, showing mainly only the components thereof embodied in the stitching mechanism which acts upon the lower corner of the mattress;

Fig. 5 an enlarged sectional detail showing the needle and a portion of the cooperating knot-tying mechanism in the position occupied just after the first advance of the needle through the material at the beginning of a cycle of the operations comprised in a stitch forming, including knot-tying, operation at one point on the corner of the mattress;

Fig. 6 a perspective view of a portion of said devices in the same relative position as shown in Fig. 5;

Figs. 7 and 8 details showing successive positions of the knot-tying devices which are assumed between the first and second needle descents in a complete cycle of operations;

Fig. 9 an elevation similar to that of Fig. 5, but with the parts in the position occupied at the second passage of the needle through the material;

Fig. 10 a representation of the parts shown in Fig. 9 seen from a different angle and with the needle in the same position as in Fig. 9, but with some of the knotter parts in a different position;

Fig. 11 a representation of the same parts as in Fig. 10, but in the position occupied when the needle has traveled a short distance in the direction to withdraw from the fabric;

Fig. 12 a view from the same point as in Figs. 10 and 11 with the parts in the position assumed when the needle has about completed its movement of withdrawal from the material, there being shown also a portion of the cutting mechanism by which the twine is cut off after the complete knotted loop or stitch has been made;

Fig. 13 a section detail on line $X^{13}$ of Fig. 12 of a portion of the thread clamping and pulling mechanism which cooperates in tightening the knot after the twine presented to the knotter at the first needle stroke has been properly looped around and engaged with the bight presented at the second needle stroke for the formation of the knot as shown in Fig. 11;

Fig. 14 is a sectional elevation on line $X^{14}$, Fig. 3 showing the stitching mechanism for the lower corner of the mattress mainly in elevation from the same view point as in Figs. 10 and 12, and a portion of the stitching mechanism for the upper corner of the mattress in section;

Fig. 15 an end view of a portion of the knot-tying mechanism that cooperates with the needle;

Fig. 16 a sectional detail of a portion of the knotter;

Fig. 17 an enlarged sectional detail showing the knotter in elevation and adjacent parts of the mechanism;

Figs. 18, 19, 20, 21 details of the needle operating mechanism and certain twine clamps cooperating therewith in the knot-tying operation;

Fig. 22, a longitudinal sectional detail of the knotter mechanism;

Figs. 23 and 24 details showing portions of the needle bar and its actuating mechanism, and the mechanism for operating the clamp jaws of the knotter mechanism;

Figs. 25 and 26 sectional details showing a part of the clamp jaw operating devices of the knotter;

Fig. 27, a detail showing a portion of the actuating mechanism for the twine cutters; and Figs. 28 and 29, details of the feed and stop mechanism.

Referring to Figs. 1 and 2, the machine in its general organization comprises a table or holder 2 for the mattress 3 to be operated upon, said table being mounted upon a suitable supporting frame 4, adjacent to a supporting frame 5 for the principal working parts of the machine, which are located at the rear, the operator in charge of the work standing at the opposite or front side where the various handles for controlling the apparatus are located.

On the main frame near the rear edge of the table a gaging flange or stop 6 is provided (better shown in Fig. 3) which constitutes an edge-gage for the side of the mattress when in proper position on the table to be sewn, and a clamping bar 7 is provided for engaging the top of the mattress for its entire length at a short distance from its edge, directly over the edge of the table 2 (see Fig. 3) to hold the same firmly during the stitching operation.

Said clamping bar 7 is shown as mounted in an elbow lever 8 fulcrumed at 9 on the framework and connected by a link 10 with an operating lever 11 fulcrumed at 12 on the framework and adapted to be moved by the operator from the full to the dotted line position shown in Fig. 1 to release the mattress, and from the dotted to the full line position to clamp and hold the mattress after it has been properly placed in gaged position against the engaging stop flange 6.

Another operating handled lever 14 at the front of the machine is connected by rod 15, with an arm on a rock shaft 16 having another arm connected by link 17 with an arm connected with the clutch control finger 18, (see Fig. 28) which acts on a suitable clutch mechanism to effect the starting or stopping of the machine at any time.

The frame 5 at the rear of the machine includes longitudinal beams 19 which serve also as a track or guideway for the stitcher carriage 30 which supports the mechanism of the stitcher and is shown as provided with wheels 31 to facilitate its movement along the guideway 19.

The said carriage 30 and mechanism supported thereon in its entirety will be referred to as the stitcher, and its mechanism includes two complete sets of stitching instrumentalities with actuating mechanism common to both, whereby they are caused to operate concurrently, one at the upper and the other at the lower corner of the side of the mattress clamped on the table 2, as will readily be understood from Fig. 3.

Without at this point explaining the stitching forming operation in detail it should be understood that a complete cycle of operations causes a single closed loop of the twine to be formed with its ends tied together by a weaver's knot, and with said loop inclosing a little of the fabric of the side of the mattress, and of the top or bottom as the case may be, and of the stuffing of the mattress lying between these portions of the fabric. In the formation of such complete knotted loop or stitch the needle makes two descents or passages through the material, one at a little distance from the other, the portion of the fabric and material between the needle holes being what is inclosed in or encircled by the knotted loop.

Such a knotted loop or stitch is complete in itself and the twine is cut off between the knot and the needle after the knot has been tied tightly, and in order to make a succession of such stitches along the side of the mattress presented to the stitching mechanism, or to proceed with the side stitching automatically, provision is made for feeding the carriage 30 of the stitcher intermittently between the successive complete stitch cycles of operation, during each of which the said carriage remains stationary.

Still referring to Figs. 1 and 2 the working parts of the machine are all actuated from a main shaft 20, said shaft having a driving pulley 21 loose thereon, and adapted to be connected by a clutch 22, the details of which need not be described until later, with a cam 23, fast on shaft 20, which acts upon a cam roller on the end of an arm 24 connected with a rock shaft 25, (see Fig. 28), having two pawl carrying arms 26, 27 provided with pawls 28, 29 (see Figs. 28, 29) which are adapted to act upon crown teeth on a sprocket wheel 32 which actuates a chain 33 connected with the carriage 30 and supported by another sprocket 34 at the other end of the frame 5 (see Fig. 2).

A shifting device 35 best shown at the left hand in Fig. 2, and in Figs. 28 and 29, causes one or the other of the pawls 28, 29 to remain out of reach of the teeth of the sprocket wheel 32, and as the said pawls operate in the same direction but at opposite sides of the center of the sprocket they will cause the latter to be turned for the space of one or more teeth in one or the other direction according as one or the other of said pawls is in operation, and will thus produce a movement or advance of the carriage 30 in one or the other direction at a certain point in the rotation of the cam 23 at a time when the stitching mechanism has completed a cycle of operations and is with the needles withdrawn from the mattress.

The shifting or reversing device or yoke 35 is connected with a rod 36 extending the length of the frame parallel with the track 19 on which the carriage 30 travels and said rod is provided with adjustable engaging blocks or tappets 37, 38 adapted to be acted upon by a projection 39 from the carriage 30 when it arrives at the proper position to complete a line of stitching along one side of the mattress.

With the parts in the position shown in Figs. 2, 28 and 29, the pawl 28 is free to operate and the pawl 29 is idle, being kept out of reach of the teeth by a portion of the yoke 35 engaging a pin projecting from the side of the pawl as shown. The feed movement of the carriage 30 is then toward the right as seen in Fig. 2, and when the projection 39 arrives at the tappet 38 it moves the same so as to move the yoke 35 to a position to cause the pawl 28 to stop operating and to release the pawl 29, and the projection 40 of the yoke 35 (see Fig. 28), engages the arm 180 connected with the finger 18, and moves it to position to cause the clutch 22 to be disengaged, so that the cam 23 and shaft 20 are stopped from operating and the action of the machine automatically ceases when the end of the side stitching along one side of the mattress is reached.

As the stitcher is stationary during the formation of each complete knotted loop or stitch, it is immaterial in which direction the feed takes place from one stitch to the next, and in order to save time after the stitching has been completed in one direction, say from left to right in Fig. 2, the mattress is unclamped and turned by the operator and the side next to be operated upon (or the side of another mattress if one has just been completed) is then stitched in a movement of the carriage from right to left.

In order to facilitate the movement of the carriage 30 independently of the automatic feed just described, a hand operated feed wheel 320 (see Fig. 1) is provided, preferably located near the middle of the machine, which is connected by shaft 321, sprocket wheel 322, and chain 323 with a sprocket wheel 324 fixed on the same shaft as the pawl operated sprocket wheel 32 above described, so that the operator by turning the wheel 320 when the pawls are disengaged, or by turning it in the direction permitted by the pawl, if one is engaged, the carriage may be moved along to the desired position on its supporting track.

Referring now to the stitching mechanism, the general organization of the parts relative to the material operated upon is best shown in Fig. 3.

To avoid possible ambiguity the entire mechanism which acts upon the twine in applying it to the mattress will be called the stitching mechanism, and inasmuch as the instrumentalities which operate at the upper corner are substantially the same as those that act at the lower corner of the mattress, the detailed description will be confined mainly to the mechanism which acts upon the lower corner, from which the operation of the mechanism which acts at the upper corner will be readily understood.

The stitching mechanism for acting upon one corner of the mattress, taking for example the lower corner, comprises a needle 100 which penetrates first the lower surface fabric and then passes diagonally upward and emerges with the twine from the side surface-fabric; and appliances (which will be referred to collectively, or as a unit, as the knotter) which act upon the twine after it has emerged from the side of the mattress in cooperation with the needle, to hold the bight presented at the first penetration of the needle and cause it to be properly engaged with or tied to the bight which is presented at the second penetration of the needle slightly to one side of the place at which the needle first penetrated.

Although in the actual location in the machine the needle which acts at the lower corner of the mattress penetrates with a diagonally upward movement, the penetrating movement of the needle will be referred to as the descent, and the withdrawal movement as the rise of the needle, as these terms are commonly used with various sewing mechanisms, and each complete knotted loop will be referred to as a stitch, and a complete row of such stitches along the corner of the mattress will be called a seam, although the twine is not continuous from one stitch to the next as in a common sewn seam.

Referring to Fig. 3 the entire stitching mechanism is actuated by a hollow cam shaft 50 supported in suitable bearings at the ends of the carriage 30, said hollow shaft 50 having a spline connection at 51 with the main shaft 20 so that the cam shaft 50 turns in unison with the main driving shaft 20, when driven by the pulley 21 and clutch 22, while being free to move to any desired position along the said driving shaft 20.

The principal working parts of the stitching mechanism are mounted upon a frame 60 of suitable form and construction comprising a supporting arm 61 having a pivotal support at 62 in a bearing affixed to the lower part of the carriage 30, the purpose being that the entire stitching mechanism and its supporting frame may have a slight rocking movement on the pivotal support 62 which, being directly below the side of the mattress, causes a movement of the entire sewing mechanism toward and from the side of the mattress.

This causes pressers or work supports 63, 64 affixed to the frame 60 to be pressed inward so as to indent the side of the mattress when in the position shown in Fig. 3, which is the position occupied when the stitches are being made, and to be slightly withdrawn from this position outward when the feed of the carriage and stitching mechanism is to take place.

This rocking movement of the stitching mechanism is produced by the cam 52 acting upon a roller 53 on the arm 61, the configuration of the cam being such as to hold the pressers 63, 64 against the work during the greater part of each rotation of the cam shaft, but to permit them to be withdrawn slightly during a small fraction of each rotation of the main shaft, at which time the projection of the feed cam 23 operates to advance the carriage to the position for the next stitch, as above described.

This slight rocking movement of the main frame of the stitching mechanism does not materially affect the action of the cams on the cam shaft 50 upon the connecting mechanism by which said cams serve to actuate the various parts of the stitching mechanism in proper timed relation to one another, substantially all of the working movements taking place while the frame 60 is in its forward position and with the pressers 63, 64 holding the mattress material properly for the stitch forming operations, and serving as the usual table or work support to act as an abutment for the material while the needle penetrates it.

Cooperating with each of the work supporting pressers 63, 64 which support the material against the thrust of the needles near where they emerge is a movable presser foot, that of the mechanism at the lower corner alone being marked 65, which descends or moves toward the material to compress and clamp it against the cooperating work support 63 before the needle descends the first time, and retains it thus clamped until just before the feed movement takes place when said presser foot is lifted and at the same time the work support 63 is moved outward by the action of the cam 52 as above described.

As will be readily understood by reference to Fig. 3, the action of the work supporting presser and presser foot at the lower corner and that at the upper corner balance one another and produce substantially equal compression of the stuffing material at the upper and lower corners, and maintain the side of the mattress in its proper relation substantially square with both the upper and lower surfaces of the mattress. The formation of the stitches at both upper and lower corners while the material is thus held retains the material in the desired balanced condition with the side of the mattress square with the top and bottom, a result that would not be attained if only the upper or lower corner was acted upon in one sewing operation, and the mattress had to be released and repositioned on its supporting table before the other corner was stitched.

As it is unnecessary to describe in detail but one of the sets of stitch making appliances, reference may best be had now, to Fig. 4 which shows the mechanism acting upon the lower corner of the mattress on a larger scale than in Fig. 3.

Said presser foot 65 is connected with a rod 66 having collars engaged by a fork at one end of a lever 67 fulcrumed on the framework 60 at 68 and having its other end provided with a cam roller to be actuated by a groove in the cam 52 on the cam shaft 50, which lifts the presser foot 65 at the time when the feed cam 23 acts to feed the stitcher carriage to the position for the next stitch, as before described.

The needle 100 (see Fig. 3) is connected by an arm 71 with a needle bar 72 adapted to move longitudinally in suitable bearing guides in the frame 60 and connected by a link 73 with an arm 74 on a rock shaft having its bearings in the carriage 30 and connected with another arm 75 having a cam roller operating in a groove in cam 56 which is constructed with two throws to cause the needle to make two descents at each rotation of the cam shaft 50 which effects one complete cycle of stitch forming operations or makes one stitch of the seam, the said cam groove having the proper configuration to effect such dwells or timing in the movements of the needle as will cause it to cooperate properly with the knotter and other instrumentalities involved in the stitch making operation.

The rock shaft to which the arms 75 and 74 are affixed has another arm 740 corresponding to 74, connected by a link with the needle bar of the stitching mechanism for the upper corner of the mattress as will be readily seen in Fig. 3 without need of designating characters, which are consequently omitted in Fig. 3 where both stitching mechanisms are shown.

For the production of the stitch employed in the present embodiment of the invention it is necessary that the needle should make a slight lateral movement between its two successive descents so as to penetrate the material the second time at a short distance from the place of the first penetration, the material lying between the two lines of penetration being what is encircled by the loop of twine pertaining to the stitch.

Figure 18:
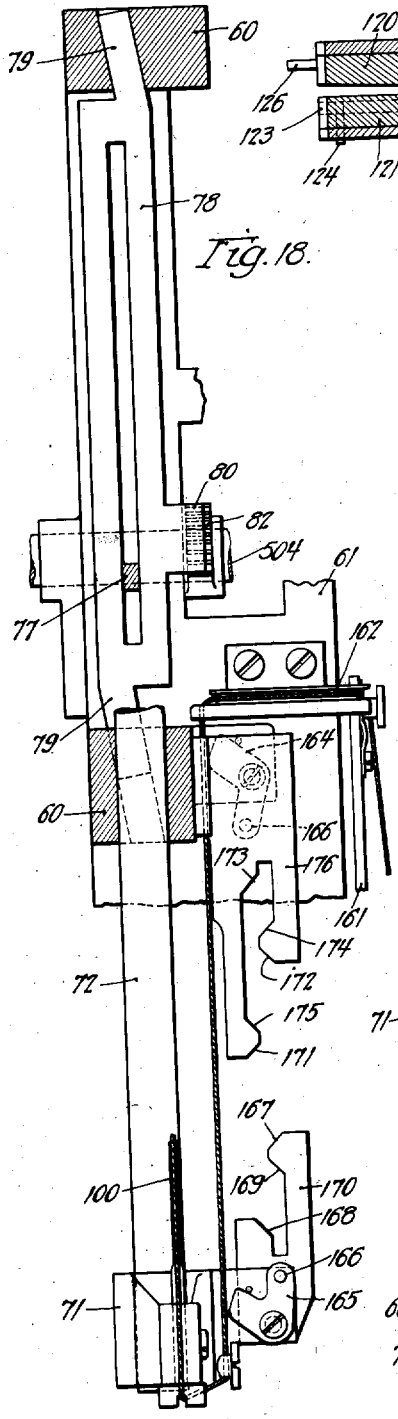

To provide for such lateral movement of the needle as shown in the present embodiment of the invention the needle bar 72 is adapted to have a slight pivotal or rotary movement in the guides in which it reciprocates, such movement being accommodated in the connection between the link 73 and the needle bar as shown in the enlarged detail Figs. 23, 24, and such oscillation of the needle bar in one direction after its first rise from the fabric, and in the other direction after its second rise, is effected by the construction best shown in the detailed view Figs. 17 and 18.

The boss on the needle bar with which the link 73 is connected is provided with a projection 77 (see also Fig. 23) which travels in a guide in a plate or bar 78 having at its ends inclined guiding portions 79 adapted to move longitudinally in suitable guideways in the frame 60, such longitudinal movement thus resulting in a short lateral movement of the plate 78 which by the projection 77 causes a slight rocking of the needle bar 72 and a considerably larger lateral movement or shogging of the needle 100 because it is carried by its arm 71 at a considerable distance from the axis of the needle bar.

The slight longitudinal movement of the plate 78 necessary to effect such lateral movement of the needle bar is produced by a short rack 80 (see Fig. 4) engaged by a toothed segment on a cam lever 81 operating in a groove in the cam 52 which produces a movement of the plate 78 or needle shogger in one direction about as the needle completes its first rise from the material and in the other direction about as the needle completes its next rise from the material, the plate remaining stationary during substantially the whole of each complete down and up stroke of the needle.

The work support 63 and presser foot 65 each have two guide passages for the needle, as best shown in the sectional details Figs. 7 and 8, with a slot connecting them sufficient for the passage of the twine as shown in Figs. 10 and 17, the needle thus being supported and guided close to its point of entrance and emergence.

Referring now to the instrumentalities involved in the stitch forming operation they will first be described in connection mainly with Figs. 5 to 13 inclusive, with reference to their cooperation in acting on the twine to form the stitch, after which the connecting mechanism by which the several instrumentalities are actuated in proper time and relation to one another will be described.

For convenience the complete set of instrumentalities which cooperate with the needle and twine where the needle emerges from the fabric regarded as a unit will be called the knotter, and said instrumentalities for the most part are mounted on or in the body piece 101 which is mainly cylindrical in form and is mounted for rotary movement in a bearing in the framework 60 as appears in the sectional view Fig. 4.

The devices which cooperate most directly with the twine are contained in a tubular portion 102 (see Fig. 4) and on a sleeve 103 mounted to rotate on said tubular portion 102 as a bearing, said tube 102 being fixed in an eccentric position in the knotter body 101 so that a rotation (in this case a quarter turn) of the latter shifts the tube and parts contained in and carried thereby laterally and at the same time produces a rotary change of position of the tube and parts contained in it for a quarter turn as will be understood by comparing Figs. 7 and 8, such movement having shifted the axis of the tube 102 from a position in line with the needle at one descent to the position in which the needle makes its next descent.

As is well shown in Fig. 4 and on a larger scale in Fig. 12 the work support 63 and the shank or bracket by which it is rigidly connected to the frame 60 are formed with an opening between them sufficient to accommodate all of the movements of the knotter mechanism.

As shown in Fig. 5 at the first descent of the needle (which is an eye pointed needle of the usual kind) a bight or hitch of the twine is carried through and beyond the material, the fold 110 being at the needle eye, and the standing part 111 of the twine leading back to the spool or supply through suitable guides and controlling devices which will be described later, while the end part 112 of the bight is long enough to remain in the material of the mattress which in connection with the work support 63 holds the end with friction sufficient to produce a slight tension if pulled upon.

The first descent of the needle is at the right hand one of the guideways in the presser foot and work support as seen in Figs. 7 and 8, and at the time of the first descent the knotter body stands in the position shown in Figs. 5, 6 and 7 in which a pair of twine gripping jaws 120, 121 stand slightly apart so that the needle carries the end twine 112 of the bight directly over the slight space betwene the jaws 120, 121, of the gripper which at this moment are slightly apart, and preferably after the needle has started slightly on its rise to the position shown in Fig. 6 so that the end thread 112 is loosened and thrown slightly away from the needle, said jaws grip the end twine and hold it firmly while the needle completes its rise thus bringing the twine to the condition shown in Fig. 7 in which the end portion 112 of the bight is held by the gripper while the standing portion 111 is drawn back above the gripper jaws although perfectly free from them.

After the end part 112 of the twine has been thus seized by the jaws of the gripper an end controlling finger or hook 122, the form and action of which is best shown in Fig. 9, on the sleeve 103 makes a slight movement sufficient to engage the end part 112 between the points where it is held by the gripper jaws and where it emerges from the material.

The end part 112 of the first bight of the twine having been thus seized by the gripper jaws and engaged by the controlling finger 122 of the knotter; the knotter body is then rotated from the position shown in Fig. 7 to that shown in Fig. 8, in which movement the gripper jaws and parts associated therewith are shifted into position to be in line with the needle at its next descent, and at the same time have made a quarter turn. In thus turning they bring a groove or open slot 123 in the jaws in line with the needle and have left the end portion 112 of twine wrapped part way around the jaws or body of the tube 102 from the point where the end emerged from the jaws in the position shown in Fig. 7 to the finger 122, about which a bight is formed, the extreme end of the twine having been thus pulled nearly or quite free from the material and work holder as shown in Fig. 8.

The standing part 111 of the thread extends almost directly from the gripper jaws to the fabric in the first needle hole, or one shown at the right hand in Figs. 7 and 8.

In this movement the first bight presented by the needle has been converted into a loop with the part 111 crossing over the part 112 and the portion 113 of the loop of twine which is wrapped around the tube 102 lies just above a loop spreader consisting of two fingers 124, one at each side of the groove 123.

The knotter parts being in the position shown in Fig. 8, the needle makes its next descent as shown in Fig. 9 and just before the point of the needle arrives at the gripper jaws the fingers of the loop spreader 124 are momentarily raised and thus lift the portion 113 of the twine so that the needle passes between it and the end of the jaws, the needle in its further movement passing over the portion of the thread still gripped in the jaws so that a new or second bight 115 of the twine has been passed through the loop formed from the bight of the twine presented to the knotter at the first needle descent. Directly after the needle has passed under the twine at 113 the fingers 124 descend to their normal position and free the portion 113 of the twine, which now becomes practically free from where it emerges from the jaws (at the left hand in Fig. 8) to where it is engaged by the finger 122 and lies loose over the second bight of the needle twine. The jaws 120, 121, of the gripper also release the twine, leaving the loop loose around the second bight.

With the parts in the position shown in Fig. 9 and preferably after the needle has risen slightly to slacken the twine, the sleeve 103 makes a further rotary movement, in which a bight spreading finger 125 passes between the needle and the end twine 115 of the second bight and spreads the said bight so that the finger 122 and bight of end twine of the first needle bight engaged therein is passed entirely through the second bight at 115, and the extreme end of the twine is drawn free from the material and work support and is in position to be seized by the jaws of a puller or knot tightener 130 as shown in Fig. 10. A stop projection or retarder 126 on the jaw 121 prevents the second bight from being dragged along by the bight spreader 125, and the end of twine which is being passed through the bight by the finger 122.

The end twine 112 presented to the knotter by the first descent and rise of the needle, has thus been looped around and passed through the bight presented at the second needle descent, in proper relation to tie the said end to the said bight with the well known weaver's knot and it remains only to draw the knot tight and to cut off any excess twine at the free end and to cut off the standing twine between the knot and the needle in such manner as to leave a free end extending from the needle of sufficient length for the end part of the first bight formed by the first needle descent at the next stitching forming operation.

These operations of tightening the knot and cutting the twine and the parts concerned therein are best illustrated in Figs. 10 to 13 inclusive, and Fig. 17 and comprise the knot tightener, marked as a whole 130, including a pair of jaws, the lower member 131 of which is pivotally mounted on a bracket 133 affixed to a rock shaft 134, by turning which the free end of the jaws may be given a movement from close to the knotter devices as shown in Fig. 10 outward to the position shown in Fig. 11, in which movement the end 112 of the first bight of twine, which by the operations above described has been looped around and then passed through the second bight 115 as shown in Fig. 11, is properly tightened in conjunction with the rise of the needle from the position shown in Fig. 10, to that shown in Fig. 11 which takes up or shortens the bight 115, and as the needle continues to rise and the tension on the end 112 is maintained by the puller 130 the knot is finally drawn tight and pulled through the needle hole into the stuffing of the mattress as appears in Fig. 12, thus having produced a complete endless loop of the twine, which encircles within it small portions of the bottom and side covering fabrics and the portion of the stuffing lying between them.

The end 112 held by the tightening device 130 and the standing twine 118 between the knot and the needle, which now stands at some distance from the presser foot 65 and material, are then cut off by cutters 150 working in guideways in the work support 63 and presser foot 65 across the second needle guideway, said cutters being operated by actuating mechanism which will be described later, with a quick movement to sever the twine, about at the time that the needle completes its rise after the stitch has been completed.

Referring again to the knot tightening device 130 the lower jaw or member 131 is pivotally connected with the bracket 133 at 135 and is normally held by a spring 136 against a stop 137 on the bracket 133 so that in the tightening movement of the needle the puller does not act positively, but merely resists the pull of the needle to the extent of the tension applied to the free end 112 of the twine by said spring 136. The upper jaw 132 is pivoted to the lower jaw at 138 and is acted upon by a spring 139 (see Fig. 17) which normally tends to close the jaws upon the twine, they being however normally held apart by a catch or trigger 140 (see Fig. 13), which is tripped just after the knotter devices arrive at the position shown in Fig. 10, so that the end 112 of the twine which has just been brought by the rotation of the sleeve 103 to the position shown in Fig. 10 just over the lower jaw 131 is snapped upon and gripped by the action of the spring 139 on the release of the upper jaw by the disengagement of the trigger 140.

When the end of the twine has been cut as above described the puller 130 is moved promptly by the spring 136 against the stop 137 and in a further movement of the bracket 133 a finger or projection 141 on the upper jaw member near its pivot strikes a fixed jaw opening stop 142 as will be understood from Fig. 12 which causes the upper jaw member to be lifted so that the trigger 140 catches beneath it and holds it open until tripped at the next operation. The natural expansion of the mattress, when relieved from the pressure of the presser foot and work support causes the loose ends of twine to disappear inside of the mattress covering fabric.

This tripping of the upper jaw of the twine puller is effected by a projection 143 carried by the actuating annulus 104 for the sleeve 103 of the knotter, which will be referred to later, which projection engages the trigger at the end of the movement by which the end of the twine has been pushed through the second needle bight as shown in Fig. 10, so that the jaws close just at the moment when the end of the twine is presented to them by the action of the finger 122, directly after which the sleeve 103 makes its return movement to the position shown in Fig. 11 which frees the end engaged by the finger 122 and also withdraws said finger and the loop spreader 125 from the second bight, leaving said bight free to tighten with the loop made from the first bight as well shown in Fig. 11.

In addition to the needle and parts of the knotter which cooperate to form the knot as has been described, there are certain instrumentalities which control the tension or pull on the twine at certain times in order to cause the knot to draw up properly and to cause it to be pulled into the material as shown in Fig. 12; these tension or twine gripping devices being mainly shown in Figs. 18 to 21 inclusive, the detailed description of which is deferred until after the description of the mechanical connections by which the various instrumentalities of the knotter mechanism which have already been described are actuated to perform the required movements in proper timed relation to one another and to the movements of the needle.

For moving the knot tightener 130 to pull up the knot the rock shaft 134 on which the bracket 133 is mounted and which has its bearings in the frame 60 is provided with an arm 145 adapted to be operated by a suitable cam plate 146 on the cam disk 56 (see Figs. 17 and 27).

The mechanism for turning the body portion 101 of the knotter from the position shown in Fig. 7 to that shown in Fig. 8 is effected by the segmental gear 105 best shown in Fig. 17, fixed to or forming a part of the said knotter body 101 and actuated by the segmental gear 83 on the lever 81, before referred to, which through the gear teeth 82 engaging with the rack 80 operates to shift the plate 78 by which the lateral or shogging movement of the needle is effected.

The movement of the lever 81 in one direction takes place when the needle has risen after the first stroke, and shifts the looper body and parts carried by it from the position shown in Fig. 7 to that shown in Fig. 8 at the same time that the plate 78 is moved to shift the needle to the position for its next stroke, and the return movement of the lever 81 by which the knotter body is moved back from the position shown in Fig. 8 to that shown in Fig. 7 takes place about as the needle completes its rise from the material at the end of the second needle stroke, and at the same time the plate 78 is shifted back, returning the needle to the proper position for the first stroke of the next stitch.

The jaws 120, 121 of the gripper are operated by the mechanism best shown in Figs. 22 to 26. Referring to Fig. 22, the jaw 121 is fixed in the tube 102, the opening and closing movement of the jaws being confined to the jaw 120 which is shown in Fig. 22 in the open position. The movable jaw 120 is formed at the end of a lever 620 fulcrumed at 621 in the tube 102 and connected at its end remote from the jaw, with a jaw actuating slide 622 adapted to work in a transverse guideway in the tube 102 and being slightly longer than the outside diameter of the tube so that when one end is flush with the outside of the tube the other end projects slightly therefrom.

It will be understood from Fig. 22 that by pressing the projecting end of the bar 622 inward to a point flush with the outside of the tube the jaw 120 will be closed toward the jaw 121 and the other end of the bar 622 will project from the other side of the tube, and the reverse movement of the bar 622 back to the position shown in Fig. 22 will then cause the opening or separation of the jaws.

These movements of the jaw operating bar 622 are performed at the proper time by a cam ring 623 best shown in Figs. 25 and 26, which encircles and is adapted to turn on the tube 102 as a bearing and is provided with internal cam recesses 624 which are not diametrically opposite to one another, and thus cause the bar 622 to be shifted from one to the other position to open or close the jaws as shown in Figs. 25, 26 by a comparatively short rotary movement of the ring 623 on the tube 102.

To produce this jaw opening and closing movement of the ring 623 at the proper times, it is provided with an eccentric stud or projection 625 in proper position to be engaged by a cam block 626, (see Figs. 23, 24) mounted on a rod 627 adapted to slide in a suitable guide way connected with the frame 60 and provided with a hub, or block 628 engaged with an arm 629 on a rock shaft provided with an arm 630 operated by suitable projections 631 on the cam disk 55.

The cam block 626 is first operated when the knotter body is in the position shown in Figs. 5, 6 and 23, just as the needle begins to rise after its first descent, and by engaging the projection 625 when in the position shown in Fig. 23 moves it from the position shown in Fig. 25 to that shown in Fig. 26, and turns the ring 623 so as to cause the jaws to close so that they grip the end portion of the bight of twine which has just been laid between them by the needle.

The knotter body is then shifted from the position shown in Fig. 7 to that shown in Fig. 8 as before described, the cam ring 623 moving with it to the position shown in Fig. 24, being frictionally held relatively to the tube and having no further action on the jaw operating bar 622 so that the jaws remain closed. Then at or near the end of the second needle descent (after it has passed the bight through the loop) the cam block 626 is again operated in the same direction as before, but by reason of the changed position of the projection 625 of the ring 623 it turns the said ring in the opposite direction, or from the position relative to the bar 622 shown in Fig. 26 to that shown in Fig. 25, and thus separates the jaws to release the loop after the needle has been properly passed through the same as indicated in Figs. 9 and 10.

The loop spreading pins 124 are fixed in rods 424 (Fig. 22), extending through the tube 102 and connected with a slide block 425 at the lower end thereof which is acted upon by a spring 426 tending to press the block 425 downward or outward from the tube and normally holding the pins 124 in the position shown in Fig. 5 below the end of the jaws over which the needle passes. Said fingers are lifted momentarily to the position shown in Fig. 9 just before the point of the needle passes them in its second descent, so as to lift that part of the twine, and thus spread the loop for the needle to pass through, and they are dropped shortly after the needle has passed through the loop so as to leave the twine free over the needle as shown in Fig. 10, about at the same time that the jaws 120, 121 are opened to release the part of the loop held by them as before described.

The slide block 425 is actuated to lift the fingers and spread the loop by a projection 427 best shown in Fig. 4 which extends through and works in a slot formed in the lower part of the tube, being actuated by a cam 428 carried by the actuating link 73 for the needle bar. When the knotter is in the position shown in Fig. 7, occupied at the first descent of the needle, the projection 427 is not in position to be engaged by the cam 428, but when the knotter is moved to the position shown in Fig. 8 preparatory for the second needle stroke, the projection 427 is brought into position to be engaged by the cam 428 which lifts it just before the needle point reaches the loop of twine at the end of the knotter. The cam 428 is pivotally connected with the needle bar link as shown, and the inclined part which acts upon the projection 427 is in the form of a laterally projecting flange the under surface of which engages with the projection 427 in the return stroke of the needle bar, and causes the cam 428 to swing on its pivot in passing over the said pin 427, which was returned to its normal position by the spring 426 directly after the cam 428 passed it in the forward or down stroke of the needle.

The mechanism which actuates the sleeve 103 and the twine end controller 122, and bight spreader 125, carried thereby is best shown in Figs. 16 and 17.

The said sleeve 103 is provided with a gear 500 meshing with internal teeth in the annulus 104 before referred to, which is concentric with the body 101 of the knotter and is provided with a toothed segment 501 meshing with a toothed segment 502 on an arm 503 fulcrumed at 504 on the framework and actuated by a suitable cam groove in the cam disk 55. The movement is such as to turn the sleeve slightly from the position shown in Figs. 5 and 6 to that shown in Fig. 7 at about the time when the jaws are closed to grip the end portion of the first bight, for the purpose of effectively engaging the end portion of the twine at a point between where it is held by the jaws and its point of emergence from the material and work support as shown in Fig. 7, after which the annulus 104 remains stationary while the knotter body is turning from the position shown in Fig. 7 to that shown in Fig. 8 in which movement the sleeve will be prevented from turning on its axis with the tube 102 and jaws, but will be given a slight relative rotation in the reverse direction owing to the relative size of the gear 500 and the internal gear with which it meshes.

Just about as the needle completes its second descent and is beginning to rise, the segment 502 is actuated to give the sleeve a quick turn from the position shown in Figs. 8 and 9 to that shown in Fig. 10 by which the second bight of twine in the needle is opened or spread, and the end of the loop formed from the first bight is carried by the finger 122 through said second bight thus spread, and the extreme free end portion of the twine is presented to the puller 130 as above described. The projection 143 at the end of this quick movement releases the jaws of the puller 130 as before explained, so that they seize the end of the twine, after which the segment 502 immediately reverses its movement and withdraws the finger 122 and bight opener 125 entirely from engagement with the twine as shown in Fig. 11, leaving it free to be drawn up tight by the puller or tightener 130 and needle as before explained. The retarder 126 as shown is a pin fixed in the jaw 120 and having no independent movement.

The cutters 150 which cut off the surplus end portion, and sever the twine between the knot and the needle, as before explained, are actuated by mechanism best shown in Figs. 14 and 27.

The cutters 150 work in suitable passages in the work support 63 and presser foot 65 as best shown in Fig. 12, being connected with cutter bars 151 which work in guides connected with said work support and presser foot.

The cutter bars 151 have at their outer ends actuating arms or projections 152 engaged respectively by the forked ends of arms 153 and 154 on a bearing shaft 155 supported in bearings in a bracket connected with the framework.

Said arm 153 is connected with an arm 156 (Fig. 27) having a cam roller adapted to be actuated by a cam projection 159 on the face of the cam disk 56, which gives the arms 153, 154 a quick vibration to cause the cutters to sever the twine about at the time when the needle completes its second up stroke at the completion of the cycle of stitch forming operations. The arm 154 which actuates the cutter 150 that is in the movable presser foot 65 is connected with the cam actuated arm 156 by pin 158, fixed to an arm 157 and passing through and capable of sliding in an aperture in the arm 154 which is thus permitted to accompany the presser foot 65 in its movement for clamping and unclamping the work while maintaining the actuating connection between the arm 154 and cam actuated arm 156.

The twine tension and clamping devices which cooperate in the knot tying operation are best shown in Figs. 18 to 21 inclusive.

Referring to Fig. 3, the spool or supply of twine is shown at 160, the twine leading therefrom under a spring to give a slight tension and pin on a take up arm 161 (see Fig. 18), which operates to take up any slack between the spool and the stitching mechanism.

The twine then passes through a guide 162 on the frame and between the jaws or members of a clamping device 164 on the frame and then through a similar clamping device 165 supported on the needle bar 72, or on the arm 71 which connects the needle bar with the needle.

The twine clamps 164, 165 are similar in construction being each in the form of a pivoted dog, the end of which may press the twine against a cooperating support or anvil to clamp it firmly, or may release the twine, each of said devices being provided with a pin 166 which serves to turn it on its pivot to grip or release the twine.

The pin 166 of the dog 164 is acted upon by cam surfaces 167, 168, 169 on a cam plate 170 fixed to and traveling with the needle bar, and the pin 166 of the clamp dog 165 is actuated by similar cam surfaces 171, 172, 173, 174 and 175 on a stationary cam plate 176.

Figure 21:
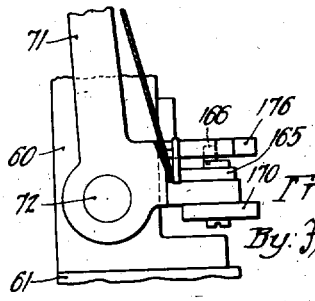

By reason of the oscillating movement of the needle bar to provide the needle shogging movement, the pins 166 are out of position to be engaged by the corresponding cams at the first stroke of the needle, in which the twine is thus free to be drawn off from the supply, except for such tension as is provided for the proper operation, but in the second needle stroke the cam plate 170 carried by the needle bar is brought into position to cooperate with the pin 166 of the clamp 164 and at the same time the pin 166 of the clamp 165 carried by the needle bar is brought into position to cooperate with the stationary cam plate 176 as shown in Fig. 21.

Figure 19:
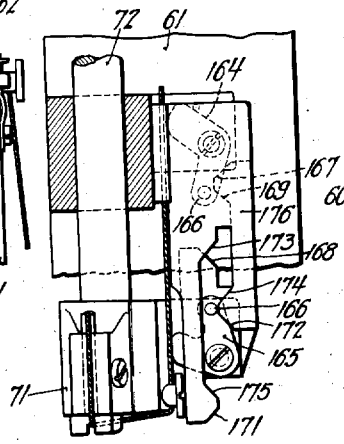
Figure 20:
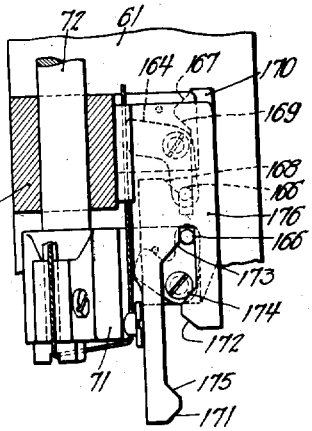

The operation of the clamps is then as follows:

Shortly before the needle arrives at the end of the second needle stroke and about as it is passing through the spread loop held by the knotter as shown in Fig. 9, the pin 166 of the dog 165 carried by the needle bar is acted upon by the cam surface 172 which causes it to grip the twine as shown in Fig. 19 in the last part of the descent of the needle, just before the end of which the cam surface 173 has acted on the pin 166 of said dog 165 as shown in Fig. 20 to release the twine where it was held clamped to the needle bar.

The effect of this is that during the latter part of the second descent of the needle it can take no more twine from the supply and consequently draws back a part of the twine of the first bight and thus tends to bring the loop made therefrom from the position at which it was formed by the knotter as shown in Fig. 10, nearer to the fabric, and also tends to tighten or shorten the loop.

Just as the needle completes its down stroke the pin of the dog 165 is acted upon by the cam 173 which unlocks the twine at the needle bar as shown in Fig. 20 and at or about at the same time the part 168 of the cam plate 170 carried by the needle bar acts upon the pin 166 of the stationary dog 164 and locks the twine coming from the supply toward the needle.

The surface 167 of the cam plate 170 in passing the pin of dog 164 had no effect as the said dog was already in unlocked position.

The needle bar on starting on the up stroke thus can at first pull no twine from the supply and it operates to take back from the portion of the twine around the material and in the previously formed loop at a rate about double the movement of the needle, this operation, in conjunction with the action of the puller or tightener 130, practically taking up such slack in the twine around the material as appears in Fig. 11 and drawing the knot tight.

After the needle has risen a short distance with the dog 164 locked and the dog 165 unlocked as has just been described, the surface 169 of the cam carried by the needle bar acts upon the pin of the dog 164 and causes it to unlock or release the twine, and at practically the same moment the surface 174 of the stationary cam plate 176 acts upon the pin of the dog 165 and causes it to lock the twine to the needle bar, so that for a short distance in the further rise of the needle bar it pulls twine positively from the supply and also pulls on the twine in the material and extending to the puller 130. Inasmuch as there is but little or no slack in the twine around the material between the needle holes at this time this operation will positively pull the knot through the needle hole and into the material between the fabric layers as shown in Fig. 12, the puller 130 yielding under the action of the spring 136 in this operation.

After the needle bar has risen far enough thus to pull the knot from the outside to the inside of the covering fabric, the pin 166 of the dog 165 is acted upon by the cam surface 175 of the stationary cam plate which causes the said dog to unlock the said twine, and, as the dog 164 has already been unlocked by the action of cam surface 169, both dogs remain unlocked throughout the rest of the needle stroke, and by reason of the oscillation of the needle bar are not again acted upon until the second needle stroke in the next stitch when the operations are performed in the latter part of the descent and early part of rise of the needle as has just been described.

After the pin 166 of dog 165 has passed the cam surface 175 the needle bar continues its upward movement and at this time the friction of the twine in the fabric together with the puller 130 prevent any further pulling back of the twine from the material and the twine is drawn off from the supply equal to about double the movement of the needle, which finishes its stroke at a considerable distance from the presser 65 so that when the cutters 150 are operated just about at the completion of the rise or upstroke of the needle a sufficient length of twine is left between the needle eye and the cutter for the end portion of the first bight of the next stitch.

At the first descent of the needle in the next stitch the twine from the needle eye to the guide on the needle bar travels with the needle so that there is no run of twine through the needle eye and as soon as the needle eye has passed into the fabric it is carried on without running through the needle eye, to present the first bight to the knotter as shown in Fig. 5.

This action would slacken the twine between the guide on the needle bar and the stationary guide 162, and the take up 161 simply operates to hold this slack without looseness until it is called for and taken up, with some additional twine from the supply, as the needle bar makes its first up stroke with the twine positively held by the clamping jaws of the knotter as indicated in Figs. 7 and 8.

The instrumentalities which act upon the twine of the stitching mechanism which operates at the upper corner of the mattress are all the same as have been above described for the stitching mechanism at the lower corner and it is unnecessary to describe in detail the actuating mechanism for each component. Some of the components of the upper stitching mechanism are well shown in Fig. 14 they being marked with the same designating characters as the corresponding parts of the lower mechanism with an added cipher for each. The needle bar is marked 720, the projection and guide plate by which it is oscillated for the shogging movement of the needle are marked 770 and 780 respectively, the knotter body 1010, the toothed segment arm for rotating it 810, the sleeve carrying the end controller and bight opener 1030, the toothed annulus by which it is rotated 1040 and the segmental toothed arm for actuating it 5030.

A link 84 (see Figs. 4 and 14) connects the segment arm 810, Fig. 14, which operates the knotter body 1010 of the upper mechanism, with an arm 85, Fig. 4, connected with the arm or lever 81 that operates the knotted body 101 of the lower mechanism, and a similar link 90 connects the segment arm 5030 that operates the sleeve of the upper knotter with an arm 91 connected with the segment arm 503 that operates the sleeve 103 of the knotter of the lower mechanism (see also Figs. 3 and 17).

The supporting and operating rod 660 for the presser foot of the upper mechanism is operated by the arm 670 connected with the arm 67 fulcrumed at 68 which operates the lower presser foot.

To effect the gripping and releasing operation of the jaws in the knotter of the upper stitcher mechanism the arm 630 which is actuated by the cam projections 631 is connected with an arm 632 which is connected by link 633 with the rod 6270 (see Fig. 14), which corresponds to the slide rod 627 carrying the cam plate 626 of the lower stitching mechanism, and said rod 6270 has connected with it a similar cam plate operating in like manner to cause the opening and closing of the jaws of the knotter of the upper mechanism by like connections in and on the knotter which are the same as in the knotter of the lower stitching mechanism, shown in Figs. 22 to 26, which serve equally well as detailed views of the knotter of the upper stitching mechanism.

As shown in Fig. 3, the cam 4280 which operates the loop spreader of the knotter of the upper mechanism is carried upon a bar connected with the hub and needle carrying arm on the needle bar, instead of being supported upon the needle bar actuating link as in the case of the lower stitching mechanism.

Referring to Fig. 14, the actuating arm 153 for the cutter 150 in the presser foot of the lower mechanism is connected by a lever 1531 and link 1532 with an arm 1560, corresponding to the actuating arm 156 (Fig. 27) for the cutters of the lower stitching mechanism, which arm 1560 operates the rock shaft 1550 and remainder of the cutter mechanism of the upper stitcher mechanism practically the same as is above described for the lower stitcher mechanism, by said arm 156 and its actuating cam.

The rock shaft 134 that operates the puller 130 of the lower mechanism is connected by beveled toothed gear segments with a shaft 1341 connected by beveled toothed gear segments at 1342 with a rock shaft 1340 which supports a bracket (corresponding to the bracket 133 of the lower mechanism) on which the puller of the upper mechanism is mounted, said upper mechanism being for the rest the same as the lower mechanism and operated in unison therewith by the gearing connection just described.

The specific construction of the clutch 22 that connects the driving pulley 21 with the feed cam 23 and main shaft 20 as before described in connection with Figs. 1 and 2 is not material, as any suitable clutch might be used, and the specific construction here adopted is sufficiently shown in dotted lines Fig. 1.

The friction shoes or gripping portions marked 22, are supported on arms 221 pivoted near one end of the cam 23 and acted upon by a spring 222 which tends to draw them together and to press the shoes 22 against the periphery of the pulley 21 so as to cause the clutch and cam 23 by which it is carried to rotate with and be driven by the pulley.

In order to disengage and stop the operation of the machine a lever 223 is provided, fulcrumed at 224 on the cam and engaging with projections on the clutch arms 221 as shown so that a movement of the lower end of said lever 223 toward the right as shown in Fig. 1 will move the clutch arms apart and disengage the clutch shoes 22 from the driving pulley.

A stud or projection 225 at the lower end of the clutch operating lever 223 extends through a slot or passage in the cam 23 of sufficient length to admit of the required operating movement of said lever, said stud 225 projecting beyond the other face of the cam 23 as shown in Fig. 2 in position to be engaged by the finger 18 of the controlling device (see Fig. 28) when properly moved to position to engage it either by the action of the projection 40 of the shifting yoke 35 shown in Fig. 28, or by the handle 14 at the front of the machine and connections shown in Fig. 1.

The mode of operation has been fully described in connection with the description of the mechanism but may be briefly summarized as follows:

The tappets 37 and 38 may be set upon the rod 36 of the stop mechanism to correspond with the length of the long side of the mattress to be stitched. A mattress is then placed by the operator upon the table 2 with the side first to be stitched against the gage 6 and is then held fast and somewhat compressed near the side by the clamp bar 7.

The stitcher carriage 30 being then near one end of the supporting guideway 19 with the stitching devices opposite the end of the mattress, the stitcher is set in operation by moving the handle 14 to disengage the clutch finger 18 from the stop projection 225 which causes the main shaft 20 to rotate and drive the cam shaft 50, which at each rotation effects one cycle of operations involved in making one complete stitch or closed knotted loop of twine at the upper and lower corners of the side of the mattress adjacent to the stitching mechanism.

At the beginning of this cycle the frame 60 of the stitcher is rocked toward the fabric causing the work supports 63, 64 to press into the side surfaces of the fabric. Then the presser foot of each mechanism is moved toward the top and bottom surfaces respectively of the mattress compressing the corner portions between them and the corresponding work supports. The needle then descends and presents a bight to the knotter which seizes the end portion of the bight near the fold at the needle eye and holds it while the needle rises.

During the rise of the needle and before its next descent is completed the knotter moves and forms the first bight into a loop and carries it to position for the needle to pass through at its next descent, the needle having been moved laterally at the completion of its rise from the material. As the point of the needle approaches, the loop spreader 124 spreads the loop after which the jaws of the knotter let go, and the bight spreader 125 and finger 122 on the sleeve 103 of the knotter carry the end portion of the first bight through the second bight and present it to the knot tightener or puller 130.

The bight spreader 125 then immediately retires from the bight, the knot puller pulls on the end of the twine and the needle pulls back on the twine toward the fabric, the twine clamping dogs 164, 165 cooperating with the needle to effect the proper tightening of the knot and to cause it to be drawn to the inside of the mattress.

The cutters 150, then cut off the surplus twine between the knot and the puller 130 and also cut between the knot and needle, completing the cycle of operations, near the close of which the presser feet are lifted, and the stitcher mechanism is rocked away from the side of the mattress, to relieve the pressure of the work supports against it, and the feed cam 23 causes the stitcher carriage 30 to be advanced to position for the next stitch, whereupon the above described cycle of operations is repeated.

When the stitcher arrives at the end of the side of the mattress being stitched the stop projection 39 engages one of the tappets 37, 38 and causes the clutch to be disengaged and the operation of the stitcher thus to be stopped, and that one of the feed pawls 28, 29 which was in operation to be withdrawn from position to engage the toothed sprocket 32 and the other of said pawls to be released ready to effect the feed of the stitcher carriage 30 in the opposite direction when the machine is again started.

The operator then releases the mattress from the clamp bar 7, turns it around and again clamps it and starts the machine which stitches back along the side thus presented until the end is reached. If the side of the mattress is shorter than the distance for which the tappets 37, 38 are set, the operator will effect the stopping of the machine at the proper time by the manipulation of the handle 14 and after again turning the mattress to present the other long side will move the stitcher carriage by the hand feed wheel 320 to position to begin stitching which is performed the same as for the side first described, after which the machine will again be stopped and the mattress turned and the fourth side stitched, completing the job for that mattress.

The construction hereinbefore shown and described affords a complete practical embodiment of the invention, but it is obvious that the construction can be widely varied from that shown without departing from the invention, which is not limited to the specific construction of the instrumentalities shown or to the specific construction and arrangement of the actuating mechanism for effecting their automatic cooperation in the performance of the work of side stitching mattresses.

While the machine herein shown is especially designed for roll edge side stitching mattresses many of the appliances and combinations of mechanisms may be adapted for other uses without departure from the invention.

What I claim is:

1. An organized machine for side-stitching mattresses comprising a supporting table for a mattress to be stitched, and a stitcher containing two sets of stitch forming instrumentalities each comprising a needle and a knotter, one of said sets being adapted to operate at the corner where the side joins the top face of the mattress and the other at the corner where the side joins the bottom face of the mattress.

2. An organized machine for side-stitching mattresses comprising a supporting table for a mattress to be stitched and a guideway parallel to one edge thereof and a stitcher supported on said guideway and containing two sets of stitch forming instrumentalities each comprising a needle and a knotter, one of said sets being adapted to operate at the corner where the side joins the top face of the mattress and the other at the corner where the side joins the bottom face of the mattress, and means for moving said stitcher intermittently between successive stitch forming, including knot-tying operations.

3. In a machine for side-stitching mattresses the combination of a supporting table for a mattress with a stitcher comprising a needle adapted to penetrate the corner portion of the mattress diagonally and a knotter cooperating with said needle where it emerges from the mattress, and a work support and presser foot both movable toward and from the mattress, whereby the material in the corner portion of the mattress is compressed and clamped during the stitch-forming, including knot-tying, operation.

4. In a machine for side-stitching mattresses the combination of a supporting table for a mattress, and a clamp for holding said mattress on said table with a stitcher comprising a needle adapted to penetrate one corner portion of the mattress diagonally and a knotter cooperating therewith, and a second needle adapted to penetrate the other corner portion of the mattress diagonally and a knotter cooperating therewith and means for actuating the needle and knotter at one corner and the needle and knotter at the other corner concurrently.

5. The combination of a supporting table for a mattress and a guideway parallel to one edge thereof and a stitcher and means for moving the said stitcher intermittently on said guideway, said stitcher comprising a needle adapted to penetrate the corner portion of the mattress diagonally and a knotter cooperating with the needle where it emerges from the mattress and a work support and presser foot both movable toward and from the mattress, whereby the material in the corner portion of the mattress is compressed and clamped at the place where the needle penetrates it in the stitch forming, including knot-tying, operation.

6. The combination of a supporting table for a mattress and a track or guideway parallel to one edge thereof, with a stitcher mechanism supported and adapted to travel on said guideway, and a main actuating shaft parallel to said guideway adapted to actuate the stitching mechanism during its movement on said guideway, and a feed cam fixed to said shaft, and feed mechanism actuated thereby comprising a feed wheel and two pawls adapted to cooperate therewith and means for rendering either one of said pawls inactive, substantially as described.

7. The combination of a supporting table for a mattress and a guideway parallel to one edge thereof with a stitcher mechanism, and means to move the same intermittently on said guideway, said stitcher mechanism comprising a needle adapted to penetrate one corner portion of the mattress diagonally and a knotter cooperating therewith, and a second needle adapted to penetrate the opposite corner portion of said mattress diagonally and a knotter cooperating therewith and a work support and presser foot cooperating with each needle and knotter and being both movable toward and from the mattress.

8. The combination of a supporting table for a mattress, and a track or guideway parallel to one edge thereof, with a stitcher mechanism supported and adapted to travel on said guideway, and a main actuating shaft parallel to the said guideway adapted to actuate the stitching mechanism during its movement on said guideway, and an actuating pulley loose on said main shaft, and a feed cam fixed to said shaft, and a clutch controlling the connection between said pulley and feed cam, and feed mechanism operated by said feed cam for advancing the stitcher mechanism on its guideway.

9. The combination of a supporting table for a mattress, and a track or guideway parallel to one edge thereof, with a stitcher mechanism supported and adapted to travel on said guideway, and a main actuating shaft parallel to the said guideway adapted to actuate the stitching mechanism during its movement on said guideway, and an actuating pulley loose on said main shaft, and a feed cam fixed to said shaft, and a clutch controlling the connection between said pulley and feed cam, and feed mechanism operated by said feed cam for advancing the stitcher mechanism on its guideway, and stop mechanism operated by said stitcher mechanism in its feeding movement to disengage the clutch, substantially as and for the purpose described.

10. An organized machine for side-stiching mattresses comprising a table or support for the mattress to be stitched, combined with a supporting track or guideway parallel to one edge thereof, and a stitcher mechanism supported on said guideway and adapted to travel along the edge of the mattress to be stitched, said stitcher mechanism comprising a needle adapted to penetrate the corner portion of the mattress diagonally having a lateral movement between two consecutive penetrating strokes, and a knotter cooperating therewith substantially as and for the purpose described.

11. In an organized machine for side-sitching mattresses, a table or support for the mattress to be stitched, and a supporting track or guideway parallel to one edge thereof, combined with a stitcher mechanism supported and adapted to travel on said guideway and comprising a frame provided with a work support, and a movable presser foot cooperating therewith, said frame being movable toward and from the table, and feed mechanism for intermittently moving said stitcher along the guideway, the stitcher frame being moved toward and from the table in the intervals between the feed movements, substantially as described.

12. In a machine for side-stitching mattresses, the combination of a supporting table and a guideway parallel to one edge thereof, with a stitcher adapted to travel on said guideway and comprising a frame and stitch forming instrumentalities thereon adapted to act at the corner where the side joins the top face of the mattress, and like instrumentalities adapted to operate at the corner where the side joins the bottom face of the mattress, and actuating mechanism common to both of said instrumentalities whereby side stitching may be performed at the top and bottom corners of the mattress concurrently, the frame for said stitch forming instrumentalities being movable toward and from the table and being provided with two work supports fixed to said frame and a movable presser foot cooperating with each and with the sets of stitch forming instrumentalities respectively, and feed mechanism for intermittently moving said stitcher on said guideway, substantially as described.

13. The combination of a needle and means for effecting two needle strokes and an intervening lateral or shogging movement of the needle at each cycle of operations, with a knotter comprising a gripper to seize the twine presented at the first needle stroke, and means for moving said gripper to form a loop from the bight of twine presented in the first needle stroke and means for passing the end part of the bight of twine presented at the first needle stroke through the bight presented at the second needle stroke substantially as described.

14. The combination of a needle and means for effecting two needle strokes and an intervening lateral or shogging movement of the needle at each cycle of operations, with a knotter comprising a gripper to seize the twine presented at the first needle stroke and means for moving said gripper to form a loop from the bight of twine presented in the first needle stroke and means for passing the end of the twine presented at the first needle stroke through the bight presented at the second needle stroke, and a knot tightening puller adapted to seize the end of the twine which has been passed through the second bight and means for moving said puller to tighten the knot.

15. The combination of a needle and means for effecting two needle strokes and an intervening lateral or shogging movement of the needle at each cycle of operations, with a knotter comprising a gripper to seize the twine presented at the first needle stroke and means for movng said gripper to form a loop from the bight of twine presented in the first needle stroke and means for passing the end of the twine presented at the first needle stroke through the bight presented at the second needle stroke, and a knot tightening puller adapted to seize the end of the twine which has been passed through the second bight and means for moving said puller to tighten the knot, and twine clamps and means for operating the same in the second needle stroke to control the twine in the pulling action of the needle and knot tightener, substantially as described.

16. The combination of a needle and means for effecting two needle strokes and an intervening lateral or shogging movement of the needle at each cycle of operations, with a knotter comprising a gripper to seize the twine presented at the first needle stroke, said gripper being movable to form a loop from the bight of twine presented in the first needle stroke, and means for passing the end of the twine presented at the first needle stroke through the bight presented at the second needle stroke, and a knot tightening puller adapted to seize the end of the twine which has been passed through the second bight and pull upon the same to tighten the knot, and cutters and actuating mechanism therefor to cut the twine between the knot and the knot tightener and needle respectively, substantially as described.

17. The combination of a needle, with a knotter comprising a gripper to seize the twine presented at one needle stroke and means for moving said gripper to form a loop in said twine, and a loop spreader adapted to operate in the next needle stroke to facilitate the passage of the needle through said loop, and an end controller adapted to engage the end of the twine presented at the first needle stroke and pass it through the bight presented at the next needle stroke, substantially as described.

18. The combination of a needle, with a knotter comprising a gripper to seize the twine presented at one needle stroke, said gripper being movable to form a loop therefrom, and a loop spreader adapted to operate in the next needle stroke to facilitate the passage of the needle through said loop, and a bight spreader and an end controller adapted to engage the end of the twine presented at the first needle stroke and pass it through the bight presented at the next needle stroke, substantially as described.

19. The combination of a needle, with a knotter comprising a gripper to seize the twine presented at one needle stroke, said gripper being movable to form a loop therefrom, and a loop spreader adapted to operate in the next needle stroke to facilitate the passage of the needle through said loop, and a bight spreader and an end controller adapted to engage the end of the twine presented at the first needle stroke and pass it through the bight presented at the next needle stroke, and a retarder to restrain said bight while the bight spreader is passing therethrough, substantially as described.

20. The combination of a needle and means for effecting two needle strokes and an intervening lateral or shogging movement of the needle at each cycle of operations, with a knotter mounted for rotary movement and having gripper jaws eccentrically located therein whereby said jaws are positioned to engage the twine presented at the first needle stroke, and have a lateral and rotary movement to form a loop from the said twine and present it in position to be traversed by the needle at its next stroke, substantially as described.

21. The combination of a needle and means for effecting two needle strokes and an intervening lateral or shogging movement of the needle at each cycle of operations, with a knotter mounted for rotary movement and having gripper jaws eccentrically located therein whereby said jaws are positioned to engage the twine presented at the first needle stroke, and have a lateral and rotary movement to form a loop from the said twine and present it in position to be traversed by the needle at its next stroke, and means for passing the end of the twine presented by the needle at the first stroke through the bight presented by the needle at the next stroke, substantially as described.

22. The combination of a needle and means for effecting two needle strokes and an intervening lateral or shogging movement of the needle at each cycle of operations, with a knotter mounted for rotary movement and having gripper jaws eccentrically located therein whereby said jaws are positioned to engage the twine presented at the first needle stroke, and have a lateral and rotary movement to form a loop from the said twine and present it in position to be traversed by the needle at its next stroke, and a twine engaging finger pivotally supported concentrically with said jaws, and having independent rotary movement on said axis, substantially as described.

23. The combination of a needle with a knotter comprising a gripper to seize the twine presented at one needle stroke and means for moving said gripper to form a loop from said twine in position to be traversed by the needle at its next stroke and an end controller adapted to engage the end of the twine presented at the first needle stroke and pass it through the bight presented at the next needle stroke, and a knot tightener comprising spring pressed jaws and a trigger device whereby they are normally held separated, and means for tripping said trigger to cause the jaws to seize he twine and for moving said jaws to pull he twine thus seized, substantially as described.

24. The combination with a needle of a knotter comprising instrumentalities cooperating with the needle to form a knotted loop and a knot tightener comprising members which grip the end twine extending from the knot and actuating mechanism for moving said tightener to pull upon the twine extending from the knot thereto and a yielding elastic connection between said gripping members and said actuating mechanism substantially as described.

25. The combination of a work support and presser foot each having two needle guide passages, with a needle adapted to operate in said guide passages alternately, and a knotter cooperating with said needle, and cutters operating in guide passages in said work support and presser foot across one of the needle passages therein, substantially as and for the purpose described.

26. The combination of a work support and presser foot each having two needle guide passages, with a needle adapted to operate in said guide passages alternately, and a knotter cooperating with said needle, and cutters operating in guide passages in said work support and presser foot across one of the needle guide passages therein, operating arms connected with said cutter, and an actuating arm therefor having a sliding connection with the operating arm for the cutter in the presser foot, substantially as described.

27. In combination a longitudinally reciprocable needle, means for actuating said needle for thrusting the end of the twine through a mattress portion, means for effecting a lateral movement of the needle relative to the mattress portion between two successive reciprocations of said needle, a knotter for tying together the ends of a twine length inserted by successive needle reciprocations, spaced from the needle actuator to admit the mattress portion between such knotter and needle, means for pulling the knot into the mattress and means for severing both twine ends extending from said knot.

28. A mechanism comprising in combination a longitudinally reciprocable needle, means for actuating said needle for thrusting the end of a twine length through a mattress portion, means for effecting a lateral movement of the needle relative to the mattress portion between two successive reciprocations of said needle, and a knotter for tying together the ends of a twine length inserted by successive needle reciprocations, spaced from the needle actuator to admit the mattress portion between such knotter and needle actuator, said knotter comprising a member revolvable around an axis arranged at an angle to the needle axis, the mechanism including means for pulling the knot into the interior of the mattress, and means for severing both twine ends extending from said knot.

29. In a mattress stitching apparatus, the combination of a reciprocatory needle for carrying the end of a continuous twine through a mattress portion, means for subsequently effecting a lateral movement of the needle relative to said mattress portion prior to reciprocating the needle for carrying an intermediate bight of the twine through the mattress portion, knotting mechanism for tying the end to the bight, means for applying pull to the standing part of the twine to draw the knot into the mattress portion, while leaving the free end of the cord projecting from the mattress, and severing members spaced apart to admit the mattress portion for cutting off respectively the standing part and the free end adjacent the mattress.

30. In a mattress stitching apparatus, the combination of a reciprocatory needle for carrying the end of a continuous twine through a mattress portion, means for subsequently effecting a lateral movement of the needle relative to said mattress portion prior to reciprocating the needle for carrying an intermediate bight of the twine through the mattress portion, knotting mechanism for tying the end to the bight, means for applying pull to the standing part of the twine to draw the knot into the mattress portion, and severing members spaced apart to admit the mattress portion for cutting off respectively the standing part and the end.

31. The combination of a needle and means for effecting two needle strokes and an intervening lateral or shogging movement of the needle at each cycle of operations, a knotter body carrying a pair of elements relatively movable constituting a gripper to seize the twine presented at the first needle stroke and means for rotating said knotter around an axis at an angle to the needle axis to form a loop from the bight of twine presented in the first needle stroke and means for passing the end of the twine presented at the first needle stroke through the bight presented at the second needle stroke.

32. The combination of a mattress support, stitching mechanism for inserting successive and separate, independent and disconnected individually tied loops of twine diagonally through one of the edges thereof and means for effecting relative step by step movements of the mattress and stitcher intermediate successive loop insertions.

33. An organized machine for side-stitching mattresses comprising a support for the mattress, a stitcher mechanism comprising a needle adapted to penetrate the edge portion of the mattress diagonally to insert the end of a continuous twine supply, a knotter coöperating therewith, means for actuating said needle and said knotter for inserting and fastening a closed loop of said twine through said edge portion, means for severing the connection between said loop and said continuous twine, and means for effecting step by step relative movements of the mattress and stitcher mechanism.

34. The combination of a mattress support, a stitcher comprising a needle, means for effecting two needle strokes diagonally through the corner of the mattress and an intervening lateral or shogging movement of the needle at each cycle of operation, a knotting element which includes a gripper for holding the twine presented at the first needle stroke and means for effecting relative movement of the twine and the said holding means for forming a loop from the bight of twine presented in the first needle stroke, means for passing the end part of the bight of twine presented at the first needle stroke through the bight presented at the second needle stroke and means for exerting tension on said end after said passage, and means for effecting step by step relative movements of the mattress and stitcher.

Kenosha, Wis., June 28th, 1921.

SIMMONS COMPANY,
*Petitioner and assignee of the original patent.*

By J. C. FERRIS,
*Vice-President.*